(12) United States Patent
Hall et al.

(10) Patent No.: US 9,238,745 B2
(45) Date of Patent: Jan. 19, 2016

(54) STRAY LIGHT RESISTANCE OF UV INKJET INKS

(71) Applicants: Stephen Anthony Hall, Wells (GB); Kirsty Margaret McVean, Paulton (GB)

(72) Inventors: Stephen Anthony Hall, Wells (GB); Kirsty Margaret McVean, Paulton (GB)

(73) Assignee: SUN CHEMICAL CORPORATION, Parsippany, NJ (US)

(*) Notice: Subject to any disclaimer, the term of this patent is extended or adjusted under 35 U.S.C. 154(b) by 0 days.

(21) Appl. No.: 14/364,161

(22) PCT Filed: Dec. 13, 2012

(86) PCT No.: PCT/US2012/069433
§ 371 (c)(1),
(2) Date: Jun. 10, 2014

(87) PCT Pub. No.: WO2013/090530
PCT Pub. Date: Jun. 20, 2013

(65) Prior Publication Data
US 2014/0370248 A1  Dec. 18, 2014

Related U.S. Application Data

(60) Provisional application No. 61/576,408, filed on Dec. 16, 2011.

(51) Int. Cl.
| | | |
|---|---|---|
| B41M 5/00 | (2006.01) |
| C09D 11/38 | (2014.01) |
| C09D 11/101 | (2014.01) |
| B41J 11/00 | (2006.01) |
| C08K 5/32 | (2006.01) |
| C08K 5/3415 | (2006.01) |
| C08K 5/3435 | (2006.01) |
| C08K 5/529 | (2006.01) |
| C09D 11/107 | (2014.01) |

(52) U.S. Cl.
CPC ............... *C09D 11/38* (2013.01); *B41J 11/002* (2013.01); *C08K 5/32* (2013.01); *C08K 5/3415* (2013.01); *C08K 5/3435* (2013.01); *C08K 5/529* (2013.01); *C09D 11/101* (2013.01); *C09D 11/107* (2013.01); *C08K 2201/012* (2013.01); *Y10T 428/24802* (2015.01)

(58) Field of Classification Search
CPC ..... C09D 11/38; C09D 11/101; B41J 11/002; C08K 5/32; C08K 5/3415; C08K 5/3435
See application file for complete search history.

(56) References Cited

U.S. PATENT DOCUMENTS

| | | |
|---|---|---|
| 5,623,001 A | 4/1997 | Figov |
| 6,294,592 B1 | 9/2001 | Herrmann |
| 2006/0004118 A1* | 1/2006 | Kunita .......................... 522/177 |

FOREIGN PATENT DOCUMENTS

| | | |
|---|---|---|
| DE | 102004040419 A1 | 2/2006 |
| WO | 01/42313 A1 | 6/2001 |
| WO | 2006/024621 A1 | 3/2006 |

OTHER PUBLICATIONS

Notification Concerning Transmittal of International Preliminary Report on Patentability (Chapter 1 of the PCT), issued in parent PCT application No. PCT/US2012/069433, dated Jun. 26, 2014.
International Search Report mailed on Sep. 20, 2013 in connection with International Application No. PCT/US2012/069433, filed Dec. 13, 2012.

* cited by examiner

*Primary Examiner* — Betelhem Shewareged
(74) *Attorney, Agent, or Firm* — Charles C. Achkar; Ostrolenk Faber LLP

(57) ABSTRACT

An energy curable inkjet ink includes a nitroxy inhibitor, a compound having an ethylenic unsaturated bond, a photoinitiator, a coloring agent, and a stray light resistance index of at least 7. A method of preparing an energy curable inkjet ink with stray light resistance includes providing a nitroxy inhibitor; providing a mixture of a compound having an ethylenic unsaturated bond, and a photoinitiator, and a coloring agent; combining the nitroxy inhibitor and the mixture to obtain the energy curable inkjet ink and thereby to increase a stray light resistance index of the energy curable inkjet ink to at least 7.

24 Claims, 3 Drawing Sheets

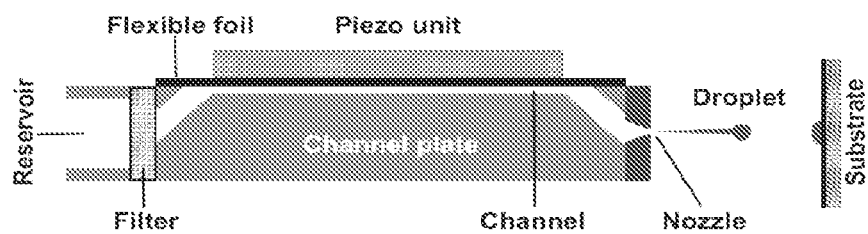
Figure 1: A cross sectional view of an ink channel with no drop deviation
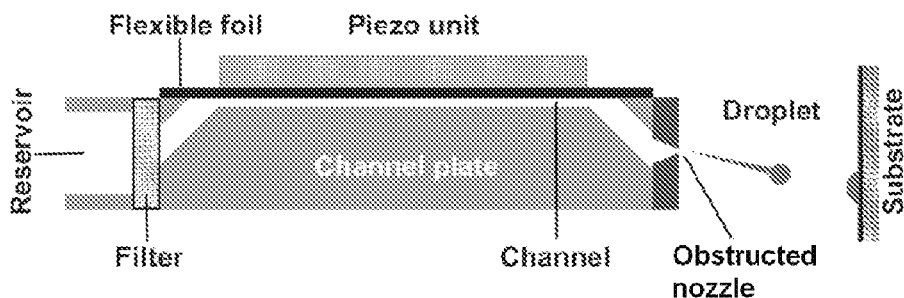
Figure 2: A cross sectional view of an ink channel with drop deviation due to a partially obstructed nozzle

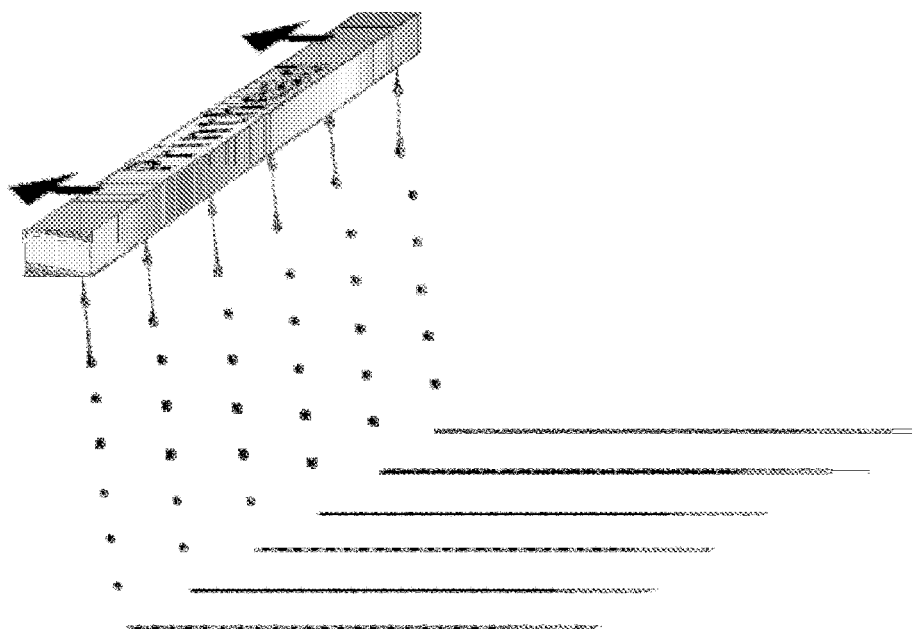
Figure 3: Normal operation of a printhead with no nozzle deviation
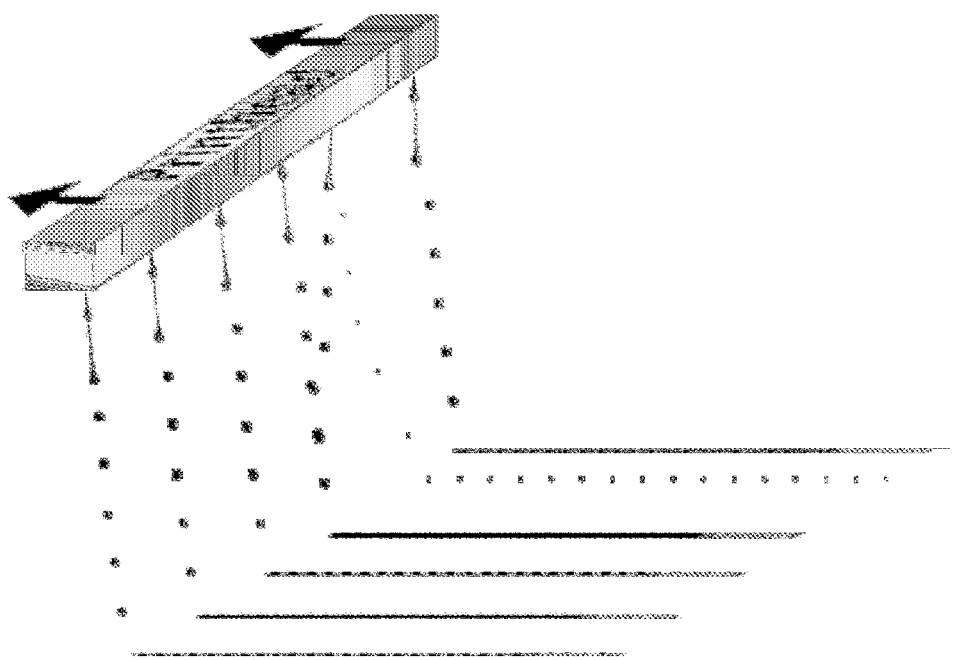
Figure 4: Operation of a printhead with nozzle deviation.

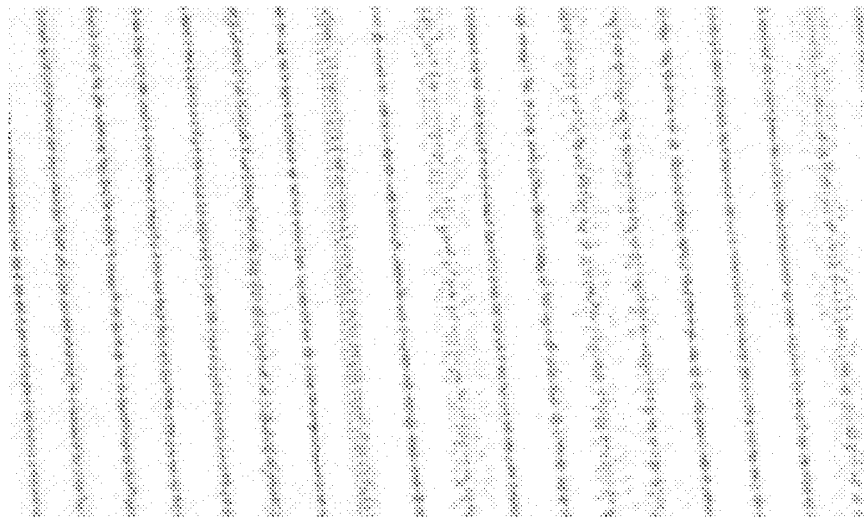
Figure 5: Scanned image of a real printhead nozzle test pattern from a wide format flatbed graphics printer using ink C69 suffering from the effect of stray light.
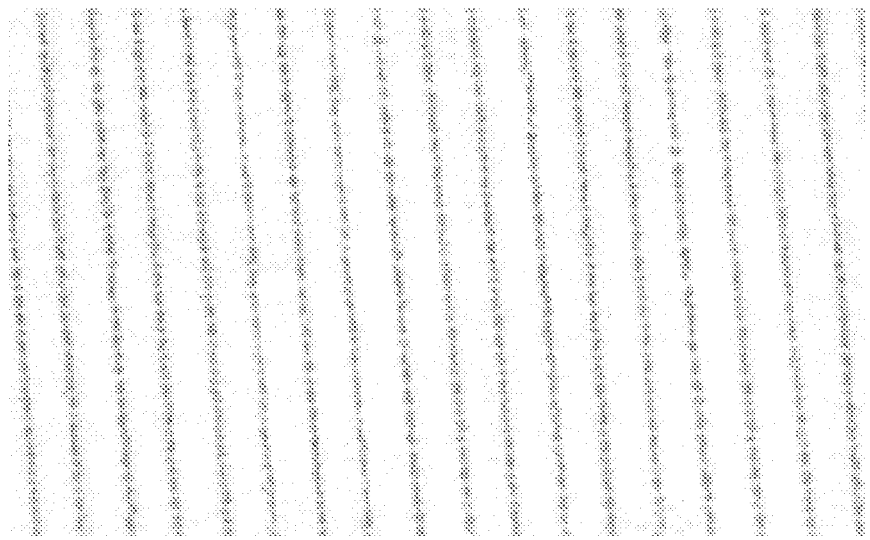
Figure 6: Image of a real printhead nozzle test pattern from a wide format flatbed graphics printer using ink E2 with no nozzle deviation.

STRAY LIGHT RESISTANCE OF UV INKJET INKS

The present application is a §371 National Phase based on International Application No. PCT/US2012/069433, filed Dec. 13, 2012, which claims the benefit of the U.S. Provisional Application No. 61/576,408, filed on Dec. 16, 2011, the subject matter of each of which is incorporated by reference in its entirety, where permitted.

BACKGROUND OF THE INVENTION

1. Field of the Invention

The present invention relates to an energy curable inkjet ink with a stray light resistance of at least 7, and a method to increase the stray light resistance of an energy curable inkjet ink to at least 7.

2. Discussion of the Related Art

Inkjet technology can deposit materials with different chemical and physical properties. Inkjet finds applications in many graphics applications including point of purchase, vehicle wraps, wide format printing, and it has also been used in electronics including the manufacture of solar panels and PCBs.

Energy curable inkjet inks are susceptible to build up of cured material at the inkjet nozzle. Traditional stabilizers do not sufficiently address the susceptibility of energy curable inkjet inks to stray light, or if they do, cure is compromised. This can be a problem in LED UV cured inks as sensitivity to UV in the UVA region means they can be susceptible to stray light.

A typical drop-on-demand (DoD) inkjet printhead may include several ink channels in parallel. Each channel has a piezo-actuator, which on application of a standard actuation voltage pulse, generates pressure oscillations inside the ink channel. These pressure oscillations then push the ink drop out of the nozzle. The print quality delivered by an inkjet printhead depends on the properties of the jetted drop. The following drop properties are preferred to give acceptable image quality, reliability and printhead performance:

Drop Velocity

The drops preferably need to be ejected at a consistent velocity to reduce dot positioning errors. If the drop speed is too slow, the sensitivity to variation in printhead to substrate distances will be higher and result in a reduction in image quality. This sensitivity is reduced if the time of flight is reduced.

Drop Mass/Volume

Depending on the application, the drop volume requirements will vary considerably with some applications needing the drop volume to be varied during the application. For the coverage of larger areas, larger drops are needed. While for high resolution printing, smaller drops are required.

Drop Shape

The formation of tails or satellite drops will negatively influence the shape of a drop on a substrate. These are not desirable for image quality.

Jet Straightness

The drops preferably need to be ejected in a straight line towards the substrate. Typically within 10 mrad accuracy or a reduction in image quality will be seen.

FIG. 1 is a cross sectional view of an ink channel with no drop deviation. FIG. 2 is a cross sectional view of an ink channel with drop deviation due to a partially obstructed nozzle. FIG. 3 shows normal operation of a printhead with no nozzle deviation. FIG. 4 shows operation of a printhead with nozzle deviation. In FIG. 4, the main drop has merged with the adjacent drop with a small satellite drop thrown to one side.

The build-up of cured material at the nozzle affects jet straightness and thus printing quality. Furthermore, once jet deviation has occurred, if it can't be recovered by flushing, then the printhead will need to be replaced.

Thus there is a need to reduce the build up of cured ink caused by exposure to low levels of UV light from stray light sources and thereby to improve printing quality and extend the life of the printheads.

SUMMARY OF THE INVENTION

Accordingly, the present invention is directed to an energy curable inkjet ink, which includes a nitroxy inhibitor, a compound having an ethylenic unsaturated bond, a photoinitiator, a coloring agent, and a stray light resistance index of at least 7. Preferably, the stray light resistance index is at least 9. More preferably, the stray light resistance index is at least 11.

One application of the present invention is that the nitroxy inhibitor has a following formula

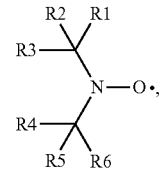

wherein R1, R2, R5, and R6 are independently hydrogen, an alkyl group, an aryl group, a halogen substituted alkyl group, or a phosphate group, and wherein R3 and R4 are an alkyl group, or R3 and R4 are linked to form a five or six membered heterocyclic aliphatic ring, the five or six membered heterocyclic aliphatic ring being substituted with hydrogen, an hydroxy group, or an aryl group.

Preferably, the nitroxy inhibitor is

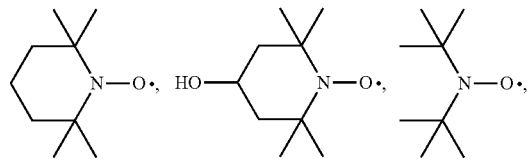

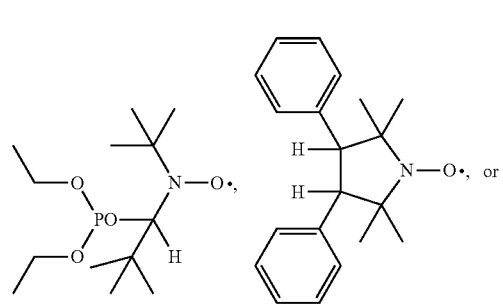

-continued

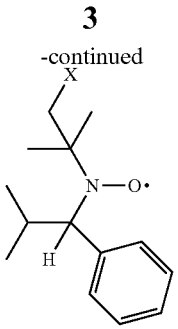

wherein X is F, Cl, Br, or I.

The nitroxy inhibitor is in an amount of about 0.01 wt % to about 1.00 wt % based on a total amount of the energy curable inkjet ink. Preferably, the nitroxy inhibitor is in an amount of about 0.10 wt % to about 0.50 wt % based on a total amount of the energy curable inkjet ink.

Another application of the present invention is that the energy curable inkjet ink further includes one or more additives, and the additives are an amine synergist, a de-aerator, a defoamer, or a surface control agent.

Another application of the present invention is that the compound having an ethylenic unsaturated bond is a monofunctional ethylenically unsaturated monomer, a polyfunctional ethylenically unsaturated monomer, or a mixture thereof, and that the compound having an ethylenic unsaturated bond is in an amount of 60-90 wt % based on the total weight of the energy curable inkjet ink.

Another application of the present invention is that the photoinitiator is in an amount of 1-20 wt % based on the total weight of the energy curable inkjet ink.

Another application of the present invention is that the coloring agent is in an amount of 0.1-30 wt % based on the total weight of the energy curable inkjet ink.

The present invention is also directed to a method of increasing a stray light resistance of an ink, and the method includes applying the energy curable inkjet ink to an inkjet printer.

The present invention is also directed to a printing article printed by the energy curable inkjet ink.

The present invention is also directed to a printing process that includes providing the energy curable inkjet ink, applying the energy curable inkjet ink to an inkjet printer, printing the energy curable inkjet ink to a subject, and curing the energy curable inkjet ink with a UV light.

The present invention is also directed to a method of preparing an energy curable inkjet ink with stray light resistance, and method includes providing a nitroxy inhibitor; providing a mixture of a compound having an ethylenic unsaturated bond, and a photoinitiator, and a coloring agent; combining the nitroxy inhibitor and the mixture to obtain the energy curable inkjet ink and thereby to increase a stray light resistance index of the energy curable ink to at least 7. The stray light resistance index can also be increased to at least 9, or be increased at least 11.

It is to be understood that both the foregoing general description and the following detailed description as well as drawings are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate applications of the invention and together with the description serve to explain the principles of the invention.

In the drawings:

FIG. 1 is a cross sectional view of an ink channel with no drop deviation.

FIG. 2 is a cross sectional view of an ink channel with drop deviation due to a partially obstructed nozzle.

FIG. 3 shows normal operation of a printhead with no nozzle deviation.

FIG. 4 shows operation of a printhead with nozzle deviation.

FIG. 5 is a canned image of a real printhead nozzle test pattern from a wide format flatbed graphics printer using ink C69 suffering from the effect of stray light.

FIG. 6 is an image of a real printhead nozzle test pattern from a wide format flatbed graphics printer using ink E2 with no nozzle deviation.

DETAILED DESCRIPTION OF THE ILLUSTRATED EMBODIMENTS

Free radical initiated polymerization is a three step process: 1) initiation; 2) propagation; and 3) termination. In inks and coatings based on acrylates, polymerization should ensue rapidly and completely only when it is required, i.e. when the printed substrate is exposed to UV light or EB radiation. The ink or coating should remain liquid and free flowing before and while it being applied to the substrate and remain largely unchanged from when it was first manufactured. In reality, the potential for polymerization exists at every step of the process, because some free radicals may be formed from purification of acrylated monomers and oligomers by distillation, heating of oligomers to make them free flowing, shear and heat built up during milling to grind and distribute pigments, during storage prior to use, and while the ink remains on the press. The preferred polymerization inhibitor can disable the initiation and propagation of unwanted free radicals without interfering with the rate or extent of cure when it is needed, is effective at low concentration in the absence or presence of oxygen, and is effective over the entire temperature range to which the ink and its ingredients will be exposed during manufacture, storage, and application.

The inventors have discovered that nitroxy inhibitors will significantly reduce the build up of cured ink caused by exposure to low levels of UV light from stray light sources, and the cured ink also maintains good water resistance and solvent resistance. The energy curable inks and the method of use described herein can thus improve printing quality and extend the life of the printheads.

Specifically, the energy curable inks described herein show a reduced susceptibility to stray light. Stray light causes a build up of cured ink on the nozzle exits, which leads to jet deviation and ultimately lost jets. Jet deviation causes a reduction in image quality and the gamut volume is reduced. The term stray light includes visible or ultraviolet radiation, which could interact with thin (UV curable) ink films and cause curing reactions to take place. This is particularly problematic on print head nozzle plates, where cured ink could block or partially obstruct jets. In some cases, high levels of incident light can cause gel formation within print head nozzles thus rendering that unit unusable.

The most obvious source of stray light in a scanning head UV inkjet printer would be the UV source itself, hence care must be undertaken to remove/baffle any reflective surfaces that the lamp may travel over during a print stroke. The height and spacing of the curing system from the print head cluster is also an important factor in controlling reflected light. Even with the optimization of the design of the cure unit, the inks will still be subjected to some stray light. Another source of stray light can be natural daylight, which contains light in the ultraviolet A region (315-400 nm), ultraviolet B region (280-315 nm), and ultraviolet C region (100-280 nm). Artificial fluorescent light can, over time, be another source of stray light as the emission spectrum contains light in the ultraviolet B and C regions.

Stray light resistance index (hereafter "SLRI") is proposed herein, and it relates to ink susceptibility to cure by stray light, and is described in detail in the Stray Light Resistance Index Test in the experimental section. SLRI is the number of flashes of UV light required to cure an energy curable ink in the Stray Light Resistance Index Test.

A typical piezoelectric drop on demand UV printer with a Dimatix, Xaar, Konica Minolta, Ricoh, TTEC, Seiko, HP, Epson, Kyocera or Panasonic (et al) has the potential to cure prematurely with stray light. An ink with a higher SLRI will be less susceptible to cure by stray light while one with a lower SLRI more so. Preferably, the inks of the present invention would have an SLRI value of at least 7, more preferably at least 8, more preferably at least 9, more preferably at least 10, more preferably at least 11, more preferably at least 12, more preferably at least 13, more preferably at least 14, and most preferably at least 15.

Additionally, the inks of the present invention maintain good water resistance and solvent resistance. Water resistance and solvent resistance are measured by the Solvent/Water Rubs Test in the experimental section. Water resistance and solvent resistance are the numbers of rubs recorded in the test. The inks of the present invention can have water resistance of at least 10, at least 20, at least 30, at least 40, at least 50, at least 60, at least 70, at least 80, at least 90, or at least 100. The inks of the present invention can also have solvent resistance of at least 10, at least 20, at least 30, at least 40, at least 50, at least 60, at least 70, at least 80, at least 90, or at least 100.

The ink compositions of the present invention can be formulated to provide cured inks that are very flexible and adhere to a wide range of substrates including, for example, re-enforced PVC Dicksonjet 620, Sattler Polyplan PVC coated polyester, PMX970 polyester, Verscadia and Heytex vinyl substrates, Kappa board card covered foam, polycarbonate, acrylic, Reynobond PVDF coated aluminum, Dibond polyester coated aluminium, Avery self adhesive vinyl, Pentawhite and Foamalux PVC, Melinex polyester, ABS plastic and Invercoate G SBS board. Ink compositions can also be formulated to produce hard rigid coatings depending on the desired application.

The inks of the present invention preferably contain less than 1% by weight of volatile organic compounds based on the total weight of the inks, more preferably less than 0.9%, more preferably less than 0.8%, more preferably less than 0.7%, more preferably less than 0.6%, more preferably less than 0.5%, more preferably less than 0.5%, more preferably less than 0.4%, more preferably less than 0.3%, more preferably less than 0.2%, and most preferably less than 0.1%. The term volatile organic compound refers to any compound which is liable to evaporate from either the liquid ink or the cured ink film during or after printing and curing. Volatile organic compounds (VOCs) are organic chemicals that have a high vapor pressure at ordinary, room-temperature conditions. Their high vapour pressure typically results from a low boiling point, which causes large numbers of molecules to evaporate or sublime from the liquid or solid form of the compound and enter the surrounding air.

The energy curable inks of the present invention include nitroxy inhibitors. It is understood that other inhibitors, for example, those classes described below (as well as other classes), could be used in combination with nitroxy inhibitors. In many instances, colored dispersions and/or monomers (or other raw materials) contain inhibitors as supplied by manufacturers and as a consequence, these inhibitors would be present in the finished inks or coatings into which they are incorporated. To summarize, as long as at least a portion of the inhibitors are of the nitroxy-type, then the inks or coatings of the present invention could also contain other inhibitors.

Seven major types of inhibitors can be used in energy curable inkjet inks, and nitroxy inhibitors are preferred. They are described as follows:

1. Nitroxy Inhibitors

Nitroxy inhibitors have a stable nitroxy group that can complex with free radicals, and represent the class of inhibitors that are used to produce the inks of the present invention. Preferably, the nitroxy inhibitors used in the present invention has the following general formula:

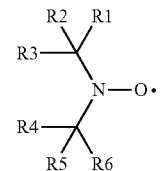

wherein R1, R2, R5, and R6 are independently hydrogen, an alkyl group, an aryl group, a halogen substituted alkyl group, or a phosphate group, and wherein R3 and R4 are an alkyl group, or R3 and R4 are linked to form a five or six membered heterocyclic aliphatic ring, the five or six membered heterocyclic aliphatic ring being substituted with hydrogen, an hydroxy group, or an aryl group.

More preferably, the nitroxy inhibitors are

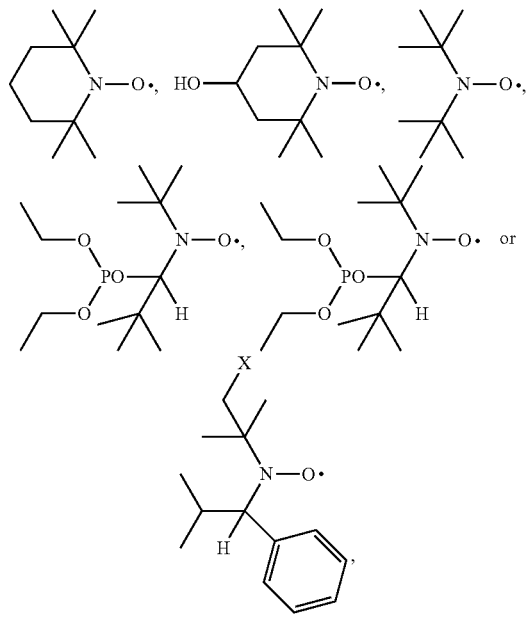

wherein X is F, Cl, Br, or I.

The amount of the nitroxy inhibitors, when present, can be present in an amount of up to or about 1 wt % based on the total weight of the energy curable ink. The amount of the nitroxy inhibitors can be present in an amount from 0.01 wt % to 1.0 wt %, 0.05 wt % to 0.75 wt %, 0.10 wt % to 0.50 wt %, and 0.15 wt % to 0.45 wt %. The amount of the nitroxy inhibitors can be 0.05 wt %, 0.10 wt %, 0.15 wt %, 0.20 wt %, 0.25 wt %, 0.30 wt %, 0.35 wt %, 0.40 wt %, 0.45 wt %, 0.50 wt %, 0.55 wt %, 0.60 wt %, 0.65 wt %, 0.70 wt %, 0.75 wt %, 0.80 wt %, 0.85 wt %, 0.90 wt %, 0.95 wt %, 0.10 wt %, 0.15 wt %, 0.20 wt %, 0.25 wt %, 0.30 wt %, 0.35 wt %, 0.40 wt %, 0.45 wt %, 0.50 wt %, 0.55 wt %, 0.60 wt %, 0.65 wt %, 0.70 wt %, 0.75 wt %, 0.80 wt %, 0.85 wt %, 0.90 wt %, 0.95 wt %, and 1.0 wt %.

2. Phenolic Inhibitors

Phenolic inhibitors are effective at low concentrations but at higher levels will interfere with the reactivity of the inks and retard the cure. They also are not effective in the absence of oxygen and can discolor the final coating. These inhibitors are chain breaking donors as they donate the proton on the phenolic hydroxyl group to stabilize energy curable inks. Common examples are hydroquinone (HQ), methyletherhydroquinone (MEHQ), butylhydroxytoluene (BHT) and more recently 2,6-di-tert-butyl-N,N-dimethylamino-p-cresol.

3. Phenothiazine

These inhibitors do not require oxygen as they work via an anaerobic mechanism. The mechanism for phenothiazine includes hydrogen atom donation with subsequent radical scavenging and hydroperoxide decomposition. Reaction products of phenothiazine (dimers, trimers, quinone-imines) also inhibit polymerization.

4. Nitrosophenylhydroxylamine(NPHA) Base Inhibitors

NPHA, amine salts, and metal salts (Al salt, N-PAL) are available commercially as neat solids and as dilute solutions in acrylate ester monomers (Albemarle, IDLCHEM, Rahn). N-PAL solutions typically contain 4 to 8% inhibitor in epoxy acrylate, fatty acid modified epoxy acrylate, and monoester acrylates (phenoxyethylacrylate) or polyester acrylates (GPTA, EOTMPTA, HDODA, TPGDA).

5. Hydroxylamine(NOH)/Alkoxyamine(NOR) Inhibitors

Hydroxylamines (NOH) and alkoxyamines (NOR) are inhibitors for free radical polymerization of acrylic monomers at low temperatures but can act as initiators at higher concentration and temperature. They can undergo a variety of mechanisms by which they trap radicals. The sequence of chemical reactions of the alkoxy/hydroxylamines is complex (described, for example, in Plastics Additives Handbook, 5th Edition).

6. Aromatic Amine Inhibitors

Typical aromatic amine stabilizers include diphenylamine (DPA) and phenylenediamine (PPD). The stabilization mechanisms of the aromatic amines has been documented and involves both scavenging of free radicals and reaction with oxygen, followed by reactions of the oxygenated amines with free radicals. Aromatic amines are more efficient hydrogen atom donors than phenolics. Oxidized reaction products of aromatic amines are highly colored, and thus are limited to black or very dark colored products. The reactive chemistry of the aromatic may be closely related to the chemistry of NPAL and related products.

7. Metal Deactivators

Preventive inhibitors, or secondary antioxidants, are classified as peroxide decomposers and metal deactivators or metal chelators. Metal ions catalyze the decomposition of peroxides generating free radicals which can destabilize energy curable inks. Metal deactivators include ureas, oxamides, carbazides, and benzotriazole. Several commercial metal deactivators are also antioxidants because of the presence of a hindered phenol (Irganox MD-1024, Naugard XL-1). These can be useful when instability is caused by metal cations which may be present in some pigments.

A traditional mercury vapour discharge lamp can be used to generate UV radiation for initiating the cure of energy curable inkjet inks. Solid state UV radiation sources such as UV light emitting diodes (LEDs) can also be used as the source of UV radiation. Mercury lamps also take time to heat up and cool down and have the potential to release mercury, which is highly toxic. UV LEDs can be rapidly switched on and off, are more energy efficient and don't generate heat, so are better for use with heat sensitive substrates. This is leading to a movement towards UV LED formulations, which can be more sensitive to issues with stray light as they contain photoinitiators with spectral absorbance in the UVA region of the electromagnetic spectrum. The inks of the present invention could also be formulated to cure by other radiation sources, such as for example microwave, infrared, electron beam, visible light, x-ray, etc.

The inks of the present invention can include a compound having an ethylenic unsaturated bond in an amount of 60 wt % to 90 wt % based on the total weight of the energy curable ink. The compound having an ethylenic unsaturated bond can be in an amount of 60 wt %, 65 wt %, 70 wt %, 75 wt %, 80 wt %, 85 wt % or 90 wt %. The compound having an ethylenic unsaturated bond is a monofunctional ethylenically unsaturated monomer, a polyfunctional ethylenically unsaturated monomer, or a mixture thereof.

It is understood that the inks of the present formulation could contain virtually any raw materials that are compatible with energy curable ink systems, the key being that the formulation incorporates nitroxy inhibitors. A partial list of some of the classes of materials that could be used to formulate the inks of the present invention are included below.

Examples of suitable monofunctional ethylenically unsaturated monomers include but are not limited to the following (and combinations thereof):

2(2-Ethoxyethoxy) ethyl acrylate; 2-phenoxyethyl acrylate; 2-phenoxyethyl methacrylate; c12/c14 alkyl methacrylate; c16/c18 alkyl acrylate; c16/c18 alkyl methacrylate; caprolactone acrylate; cyclic trimethylolpropane formal acrylate; ethoxylated (4) nonyl phenol acrylate; isobornyl acrylate; isobornyl methacrylate; isodecyl acrylate; lauryl acrylate; methoxy polyethylene glycol (350) monomethacrylate; octyldecyl acrylate; polypropylene glycol monomethacrylate; stearyl acrylate; tetrahydrofurfuryl acrylate; tetrahydrofurfuryl methacrylate; tridecyl acrylate.

As part of the monofunctional ethylenically unsaturated vinyl materials may be included such as N-vinyl pyrollidone, N-vinyl caprolactam, vinyl ethers and styrene.

Examples of Suitable polyfunctional ethylenically unsaturated monomers include but are not limited to the following (and combinations thereof): 1,3-butylene glycol dimethacrylate; 1,4-butanediol dimethacrylate; 1,6 hexanediol diacrylate; 1,6 hexanediol dimethacrylate; alkoxylated diacrylate; diethylene glycol dimethacrylate; dipropylene glycol diacrylate; ethoxylated (10) bisphenol a diacrylate; ethoxylated (2) bisphenol a dimethacrylate; ethoxylated (3) bisphenol a diacrylate; ethoxylated (3) bisphenol a dimethacrylate; ethoxylated (4) bisphenol a diacrylate; ethoxylated (4) bisphenol a dimethacrylate; ethoxylated bisphenol a dimethacrylate; ethoxylated (lO) bisphenol dimethacrylate; ethylene glycol dimethacrylate; polyethylene glycol (200) diacrylate; polyethylene glycol (400) diacrylate; polyethylene glycol (400) dimethacrylate; polyethylene glycol (400) dimethacrylate; polyethylene glycol (600) diacrylate; polyethylene glycol (600) dimethacrylate; polyethylene glycol 400 diacrylate; propoxylated (2) neopentyl glycol diacrylate; tetraethylene glycol diacrylate; tetraethylene glycol dimethacrylate; tricyclodecane dimethanol diacrylate; tricyclodecanedimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated 5 pentaerythritol triacrylate; ethoxylated (20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris(2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate.

The inks of the present invention can include a photoinitiator in an amount of 1 wt % to 20 wt % based on the total weight of the energy curable ink. The photoinitiator can be in an amount of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

Suitable photoinitiators include but are not limited to the following (and combinations thereof):

α-Hydroxyketones, including but not limited to 1-hydroxy-cyclohexyl-phenyl-ketone; 2-hydroxy-2-methyl-1-phenyl-1-propanone; 2-hydroxy-1-{4-[4-(2-hydroxy-2-methyl-propionyl)-benzyl]-phenyl}-2-methyl-propan-1-one; 2-hydroxy-1-[4-(2-hydroxyethoxy)phenyl]-2-methyl-1-propanone, acylphosphine oxides including but not limited to 2,4,6-trimethylbenzoyl-diphenylphosphine oxide; 2,4,6-trimethylbenzoyl-diphenyl phosphinate; bis(2,4,6-trimethylbenzoyl)-phenylphosphineoxide, α-aminoketones including but not limited to 2-methyl-1[4-(methylthio)phenyl]-2-morpholinopropan-1-one. 2-benzyl-2-dimethylamino-1-(4-morpholinophenyl)-butanone-1; 2-dimethylamino-2-(4-methylbenzyl)-1-(4-morpholin-4-yl-phenyl)-butan-1-one.

Examples of other suitable photoinitiators include benzil dimethyl ketal, thioxanthone initiators 2-4-diethylthioxanthone, isopropylthioxanthone, 2-chlorothioxanthone, 1-chloro-4-propoxythioxanthone, benzophenone initiators benzophenone, 4-phenylbenzophenone, 4-methylbenzophenone, methyl-2-benzoylbenzoate, 4-benzoyl-4-methyldphenyl sulphide, phenylglyoxylate initiators phenyl glyoxylic acid methyl ester, oxy-phenyl-acetic acid 2-[2-hydroxyethoxy]-ethyl ester or oxy-phenyl-acetic acid 2-[2-oxo-2-phenyl-acetoxy-ethoxy]-ethyl ester, titanocen radical initiator titanium bis(η5-2,4-cyclopentadien-1-yl)bis[2,6-difluoro-3-(1h-pyrrol-1-yl)phenyyl], oxime ester radical initiators [1-(4-phenylsulfanylbenoyl)heptylideneamino] benzoate or [1-[9-ethyl-6-(2-methylbenzoyl)carbazol-3-yl] ethylideneamino]acetate plus others including methyl benzoylformate, 1-phenyl-1,2-propanedione-2-(o-ethoxycarbonyl)oxime, 4,4,4-hexyamethyltriamino) triphenyl methane, 2-benzyl-2-dimethylamino-4-morpholinobutyrophenone, 2-methyl-1-(4-methylthiophenyl)-2-morpholineopropan-1-one, 4,4-bis (diethylamino)benzophenone, 2-ethyl anthraquinone.

Polymeric photoinitiators are also suitable including, for example, polymeric aminobenzoate GENOPOL AB-1, polymeric benzophenone derivative GENOPOL BP-1 and polymeric thioxanthone derivative GENOPOL TX-1 from RAHN.

The inks of the present invention can include one or more additives, and the additives can be an amine synergist, a de-aerator, a defoamer, or a surface control agent. The additives can be in an amount of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

An amine synergist may also be included in the ink formulation, suitable examples include, but are not limited to the following (and combinations thereof):

Ethyl-4-(dimethlamino)benzoate, 2-ethylhexyl-4-(dimethylamino)benzoate, 2-(dimethylamino)ethylbenzoate, poly[oxy(methyl 1,2-ethanediyl)], α-[4-(dimethylamino) benzoyl-α-butoxy, butoxyethyl-4-(dimethylamino)benzoate plus EBECRYL 80/81/83, EBECRYL LEO 10551/10552/10553, EBECRYL 7100, and EBECRYL P116 available from CYTEC; CN 501, 503, 550, CN UVA421, CN 341, 3705, 3715, 3735, 3755, 381, 384, 584, 554 all available from SARTOMER; GENOMER 5142, 5161, 5275 FROM RAHN; PHOTOMER 4771, 4779F, 4967F, 4968F, 5006F, 4775F, 5960F, LAROMER LR 8996, LAROMER PO 94F AND LAROMER P077F all available from BASF; OMNIRAD CI-250 and OMNILANE A1230C FROM IGM RESINS; and DESMOLUX VPLS 2299 from BAYER COATINGS.

Included in the ink formulation can optionally be a suitable de-aerator, these prevent the formation of air inclusions and pinholes in the cured coating. These also reduce rectified diffusion, which can cause reliability issues in the printhead. Examples include the following products available from EVONIK: TEGO AIREX900, 910, 916, 920, 931, 936, 940, 944, 945, 950, 962, 980, 986.

Defoamers can also optionally be included in the formulation, these prevent the formation of foam during manufacture of the ink and also while jetting. These are particularly important with recirculating printheads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, 883, TEGO FOAMEX K3, TEGO FOAMEX K7/K8 and TEGO TWIN 4000 available from EVONIK. Available from BYK is BYK-066N, 088, 055, 057, 1790, 020, BYK-A 530, 067A, and BYK 354.

Surface Control Additives are often optionally used to control the surface tension of the ink which is required to adjust the wetting on the face plate of the printhead and also to give the desired drop spread on the substrate or in the case of multi pass inkjet printing, wet on dry drop spread. They can also be used to control the level of slip and scratch resistance of the coating. Examples of suitable surface control additives include but are not limited to TEGO FLOW300, 370, 425, TEGO GLIDE 100, 110, 130, 406, 410, 411, 415, 420, 432, 435, 440, 482, A115, B1484, TEGO GLIDE ZG 400, TEGO RAD2010, 2011, 2100, 2200N, 2250, 2300, 2500, 2600, 2650, 2700, TEGO TWIN 4000, 4100, TEGO WET 240, 250, 260, 265, 270, 280, 500, 505, 510 and TEGO WET KL245 all available from EVONIK. Available from BYK are BYK 333, 337, BYK UV3500, BYK 378, 347, 361, BYK UV3530, 3570, CERAFLOUR 998, 996, NANOBYK 3601, 3610, 3650 and CERMAT 258. From CYTEC EBECRYL 350, 1360, MODAFLOW 9200, EBECRYL 341. From SARTOMER the aliphatic silicone acrylate CN9800 may be used.

The inks of the present invention can include a colorant, and the colorant can be in an amount of 0.1-30 wt % based on the total weight of the energy curable inkjet ink. The additives can be in an amount of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 2.0 wt %, 3.0 wt %, 4.0 wt %, 5.0 wt %, 6.0 wt %, 7.0 wt %, 8.0 wt %, 9.0 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

The colorant can be pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Colour Index International according to the following trade designations, blue pigments PB1, PB 15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments.

The pigments can be milled to typically less than 1 micrometer after milling with a preferred particle size distribution of 10-500 nm, more preferably 10-350 nm to have better transparency and a wide colour gamut. The pigment dispersion will typically contain 60-90% monomer which can be a mono or multifunctional (meth)acrylate monomer, with added stabilizer, inhibitor, dispersant and optionally a pigment additive/synergist and/or a wetting additive/oligomer/resin. The ratio of pigment to dispersant would usually be 1:2 to 9:1 depending on the chemistry of the pigment and dispersant. Typical dispersants would include EFKA 7414, 7476, 7477, 7700, 7701, 7702, 7710, 7731 and 7732 available from BASF and SOLSPERSE 1700, 1900, 240005C/GR, 26000, 32000, 33000, 35000, 36000, 39000, 41000 and 71000 available from LUBRIZOL. Examples of additive/synergists to aid dispersion stability include SOLSPERSE 5000, 12000 and 22000 from LUBRIZOL.

The present invention has been described in detail, including the preferred embodiments thereof. However, it will be appreciated that those skilled in the art, upon consideration of the present disclosure, may make modifications and/or improvements on this invention that fall within the scope and spirit of the invention.

Experimental Section

Test Procedures

Viscosity: it was measured with the following condition: Brookfield DV2+Pro Viscometer; spindle S18; 100 rpm; 50° C.

Stray Light Resistance Index Test:

Settings: EXFO Omnicure Series 2000; aperture size 5%; flash length to 0.2 seconds; center of the beam at 3 mJcm$^{-2}$ using the IL390C Light Bug.

Procedure:

1. Draw down a 12 µm layer of the ink onto a ISO 8037/1 glass microscope slide using the RK K Bar manually.

2. Place a 22×22 Menzel-Glase slide cover gently on top of the ink layer, so that the cover is wetted.

3. Immediately place the slide where the centre of the beam lands and perpendicular to the beam.

4. Give one flash of UV light.

5. Using a tool to gently nudge the slide cover along the width of the slide

6. Repeat steps 4 and 5 until the ink has cured and the slide cover is immovable.

7. The number of flashes required to cure the ink will be equal to the light resistance index.

Fusion UV Curing Rig:

Switch on the Fusion UV conveyor and the H bulb.

Adjust the conveyor belt speed to 30 m/min and check the UV dose is 150 mJ/cm$^2$; measure this using the IL390C light Bug. If the dose does not equal 150 mJ/cm$^2$ adjust the belt speed as required.

LED Nordson Curing Rig:

Switch on the Nordson conveyor and Integration Technology (395 nm 8 W/cm$^2$) SolidCure LED system.

Adjust the conveyor belt speed so that the UV dose is 150 mJ/cm$^2$; measure this using the EIT Power Puck II.

Solvent/Water Rubs:

1. Draw down and cure a 12 µm layer of the ink onto a Leneta 2A form.

2. Saturate cotton tipped applicator in the solvent (IPA or Water).

3. Wipe the ink coating with the applicator (using the pressure of writing with a pencil) from left to right and back to the starting position; this would count as one rub.

4. Repeat until the coating starts to erode, the end point is reached when flecks of the Leneta card are visible through the coating.

5. Record the number of rubs taken to reach prior step 4.

EXAMPLES

The following examples illustrate specific aspects of the present invention and are not intended to limit the scope thereof in any respect and should not be so construed.

Inventive Examples E1-E8 Vs. Comparative Examples C1-C72

63 parts of propoxylated (2) neopentylglycol diacrylate available from Sartomer as SR9003, 11 parts of Solsperse 39000 a dispersant available from Lubrizol and 1 part of Genorad 16 a stabilizer from Rahn were placed under a Silverson high speed stirrer. 25 parts of Spectrapac Blue a copper phthalocyanine blue pigment available from SunChemical was added slowly with continued stirring until a homogeneous, lump free dispersion was obtained. This is Premix 1.

Switch on the chiller unit to the dispermat mill SL-12-C filled with 0.65 mm zirconia beads and wait for 20 minutes. Check the oil level is at the correct level and top up if required. Switch on the mill and set the wall line pressure to 4 bar and set the mill pressure to 2 bar. Add Premix 1 to the mill reservoir and slowly increase the mill rmp to 3000, monitor the temperature and do not let it go above 50° C. If the temperature increases above 50° C. reduce the mill rpm until the temperature drops to 40° C. and then slowly increase again as required. Once completed empty the dispersion back into the reservoir and repeat a further two times. Check the particle size distribution is between 50-400 nm. This is Dispersion 1.8

80 parts 2-phenoxyethyl acrylate a mono functional acrylate monomer available from Sartomer as SR339 and 20 parts of Elvacite 2013, an acrylic resin available from Lucite International Inc, comprising of a copolymer of methylmethacrylate and n-butyl methacrylate were mixed under stirring until a homogeneous mixture was obtained. This is Resin 1.

Inks were weighed out according to the composition below and stirred until homogeneous using a silverson mixer.

A 12μ drawdown was prepared on Laneta card and given a dose of 150 mJ/cm² by putting through a Fusion UV curing rig. The belt speed was set a 30 m/min and the dose was determined using a IL390C Light Bug. The solvent and water resistance was then determined as detailed in the attached test methods. Results are shown in Table 1.

TABLE 1

Inventive Examples E1-E8 Ink

| Ink Composition | E1 | E2 | E3 | E4 | E5 | E6 | E7 | E8 |
|---|---|---|---|---|---|---|---|---|
| NVC | 21.00 | 21.00 | 24.40 | 21.00 | 21.00 | 21.00 | — | — |
| PHEA | 39.10 | 39.00 | 51.60 | 39.10 | 39.00 | 38.70 | — | — |
| PONPGDA | 2.60 | 2.60 | — | 2.60 | 2.60 | 2.60 | — | — |
| Resin 1 | 20.50 | 20.50 | 4.00 | 20.50 | 20.50 | 20.50 | — | 5.20 |
| Lucerin TPO | 2.20 | 2.20 | 4.80 | 2.20 | 2.20 | 2.20 | — | 4.90 |
| Omnirad 481 | 4.00 | 4.00 | — | 4.00 | 4.00 | 4.00 | 2.00 | — |
| Irgacure 819 | — | — | 2.60 | — | — | — | 6.00 | 2.60 |
| CN965 | — | — | 10.30 | — | — | — | 3.00 | 4.50 |
| TDA | — | — | — | — | — | — | 6.80 | 4.30 |
| CTFA | — | — | — | — | — | — | 71.75 | 76.45 |
| CN9800 | — | — | — | — | — | — | 0.20 | 0.20 |
| Ebecryl 350 | 0.50 | 0.50 | 0.50 | 0.50 | 0.50 | 0.50 | — | — |
| Dispersion 1 | 10.00 | 10.00 | 1.30 | 10.00 | 10.00 | 10.00 | 9.70 | 1.30 |
| OHTEMPTO | 0.10 | 0.20 | 0.50 | — | — | — | 0.55 | 0.55 |
| TEMPO | — | — | — | 0.10 | 0.20 | 0.50 | — | — |
| Viscosity 50° C. | 12.0 | 12.0 | 11.8 | 12.1 | 12.0 | 12.0 | 13.5 | 11.8 |
| SLRI | 12 | 16 | 7 | 7 | 13 | 28 | 15 | 9 |
| Water Resistance | >100 | >100 | >100 | >100 | >100 | >100 | >100 | >100 |
| Solvent Resistance | 35 | 30 | 85 | 25 | 25 | 25 | 86 | 78 |

NVC: N-vinyl caprolactam ex BASF
PHEA: 2-phenoxyethyl acrylate, SR339, ex Sartomer
PONPGDA: propoxylated(2)neopenyl glycol diacylate, SR9003, ex Sartomer
Lucerin TPO: Diphenyl (2,4,6-trimethylbenzoyl)-phosphine oxide ex BASF
Omnirad 481: 1-Hydroxycyclohexylphenyl ketone ex IGM Resins
Ebecryl 350: copolymerisable silicone diacrylate ex Cytec
OHTEMPO: 4-Hydroxy-2,2,6,6-tetramethyl-piperidinooxy ex Specbiochem
TEMPO: (2,2,6,6-Tetramethylpiperidin-1-yl)oxyl ex Nanjing Chunking Chemical Corporation As shown in Table 1, inks made with nitroxy inhibitors OHTEMPO and TEMPO show excellent values for SLRI and very good water and solvent resistance. The SLRI can generally be seen to increase with increasing levels of nitroxy stabilizer while the water and solvent resistance remains good. Specifically, FIG. 6 shows the image of a real printhead nozzle test pattern from a wide format flatbed graphics printer using ink E2 with no nozzle deviation.

TABLE 2

Comparative Examples CI-C 12

| Ink Composition | C1 | C2 | C3 | C4 | C5 | C6 | C7 | C8 | C9 | C10 | C11 | C12 |
|---|---|---|---|---|---|---|---|---|---|---|---|---|
| NVC | 21.0 | 21.0 | 21.0 | 21.0 | 21.0 | 21.0 | 21.0 | 21.0 | 21.0 | 21.0 | 21.0 | 21.0 |
| PHEA | 39.1 | 39.0 | 38.7 | 38.2 | 39.1 | 39.0 | 38.7 | 38.2 | 38.7 | 38.2 | 36.7 | 34.2 |
| PONPGDA | 2.6 | 2.6 | 2.6 | 2.6 | 2.6 | 2.6 | 2.6 | 2.6 | 2.6 | 2.6 | 2.6 | 2.6 |
| Resin 1 | 20.5 | 20.5 | 20.5 | 20.5 | 20.5 | 20.5 | 20.5 | 20.5 | 20.5 | 20.5 | 20.5 | 20.5 |
| Lucerin TPO | 2.2 | 2.2 | 2.2 | 2.2 | 2.2 | 2.2 | 2.2 | 2.2 | 2.2 | 2.2 | 2.2 | 2.2 |
| Onmirad 481 | 4.0 | 4.0 | 4.0 | 4.0 | 4.0 | 4.0 | 4.0 | 4.0 | 4.0 | 4.0 | 4.0 | 4.0 |
| Ebecryl 350 | 0.5 | 0.5 | 0.5 | 0.5 | 0.5 | 0.5 | 0.5 | 0.5 | 0.5 | 0.5 | 0.5 | 0.5 |
| Dispersion 1 | 10.0 | 10.0 | 10.0 | 10.0 | 10.0 | 10.0 | 10.0 | 10.0 | 10.0 | 10.0 | 10.0 | 10.0 |
| Irganox3052 | 0.1 | 0.2 | 0.2 | 1.0 | — | — | — | — | — | — | — | — |
| Irgastab1076 | — | — | — | — | 0.1 | 0.2 | 0.5 | 1.0 | — | — | — | — |
| Florstab UV-8 | — | — | — | — | — | — | — | — | 0.5 | 1.0 | 2.5 | 5.0 |
| Viscosity 50° C. | 12.1 | 12.0 | 12.0 | 12.1 | 12.0 | 12.2 | 12.1 | 12.2 | 12.0 | 12.1 | 12.2 | 12.3 |
| SLRI | 4 | 3 | 3 | 3 | 3 | 2 | 3 | 3 | 3 | 3 | 4 | 4 |
| Water Resistance | >100 | >100 | >100 | >100 | >100 | >100 | >100 | >100 | >100 | >100 | >100 | >100 |
| Solvent Resistance | 72 | 76 | 51 | 54 | 100 | 86 | 90 | 76 | 90 | >100 | 80 | >100 |

Irganox3052: 2-(3-tert-butyl-2-hydroxy-5-methylbenzyl)-6-tert-butyl-4-methylphenyl acrylate ex BASF
Irgastab1076: hindered phenol stabilizer ex BASF
Florstab UV-8: stabilizer in acrylate monomer ex Kromochem As shown in Table 2, the stabilizers Irganox 3052, Irgastab 1076 and Florstab UV-8 give a low SLRI even when the level is increased to 1% or 5%.

TABLE 3

Comparative Examples C13-C24

| Ink Composition | C13 | C14 | C15 | C16 | C17 | C18 | C19 | C20 | C21 | C22 | C23 | C24 |
|---|---|---|---|---|---|---|---|---|---|---|---|---|
| NVC | 21.0 | 21.0 | 21.0 | 21.0 | 21.0 | 21.0 | 21.0 | 21.0 | 21.0 | 21.0 | 21.0 | 21.0 |
| PHEA | 39.1 | 39.0 | 38.7 | 38.2 | 39.1 | 39.0 | 38.7 | 38.2 | 39.1 | 39.0 | 38.7 | 38.2 |
| PONPGDA | 2.6 | 2.6 | 2.6 | 2.6 | 2.6 | 2.6 | 2.6 | 2.6 | 2.6 | 2.6 | 2.6 | 2.6 |
| Resin 1 | 20.5 | 20.5 | 20.5 | 20.5 | 20.5 | 20.5 | 20.5 | 20.5 | 20.5 | 20.5 | 20.5 | 20.5 |
| Lucerin TPO | 2.2 | 2.2 | 2.2 | 2.2 | 2.2 | 2.2 | 2.2 | 2.2 | 2.2 | 2.2 | 2.2 | 2.2 |
| Omnirad 481 | 4.0 | 4.0 | 4.0 | 4.0 | 4.0 | 4.0 | 4.0 | 4.0 | 4.0 | 4.0 | 4.0 | 4.0 |
| Ebecryl 350 | 0.5 | 0.5 | 0.5 | 0.5 | 0.5 | 0.5 | 0.5 | 0.5 | 0.5 | 0.5 | 0.5 | 0.5 |
| Dispersion 1 | 10.0 | 10.0 | 10.0 | 10.0 | 10.0 | 10.0 | 10.0 | 10.0 | 10.0 | 10.0 | 10.0 | 10.0 |
| BHT | 0.1 | 0.2 | 0.5 | 1.0 | — | — | — | — | — | — | — | — |
| MEHQ | — | — | — | — | 0.1 | 0.2 | 0.5 | 1.0 | — | — | — | — |
| HQ | — | — | — | — | — | — | — | — | 0.1 | 0.2 | 0.5 | 1.0 |
| Viscosity 50° C. | 12.1 | 11.9 | 12.0 | 12.1 | 12.1 | 12.2 | 12.4 | 12.4 | 11.9 | 12.1 | 12.1 | 12.0 |
| SLRI | 2 | 2 | 3 | 3 | 3 | 3 | 3 | 4 | 4 | 5 | 8 | 6 |
| Water Resistance | >100 | >100 | >100 | >100 | >100 | >100 | >100 | >100 | >100 | 80 | 65 | 2 |
| Solvent Resistance | 60 | 80 | 65 | 45 | 60 | 40 | 20 | 60 | 20 | 10 | 5 | 1 |

BHT: butylated hydroxytoluene ex Sigma Aldrich
MEHQ: hydroquinone monomethyl ether ex Sigma Aldrich
HQ: hydroquinone ex Sigma Aldrich As shown in Table 3, the stabilizers BHT, MEHQ and HQ give SLRI values than nitroxy types even when the level is increased to 1%. HQ also shows a reduction in solvent resistance as the level of stabilizer is increased showing that the stabilizer has negatively affected cure.

TABLE 4

Comparative Examples C25-C36

| Ink Composition | C25 | C26 | C27 | C28 | C29 | C30 | C31 | C32 | C33 | C34 | C35 | C36 |
|---|---|---|---|---|---|---|---|---|---|---|---|---|
| NVC | 21.0 | 21.0 | 21.0 | 21.0 | 21.0 | 21.0 | 21.0 | 21.0 | 21.0 | 21.0 | 21.0 | 21.0 |
| PHEA | 39.1 | 39.0 | 38.7 | 38.2 | 39.1 | 39.0 | 38.7 | 38.2 | 39.1 | 39.0 | 38.7 | 38.2 |
| PONPGDA | 2.6 | 2.6 | 2.6 | 2.6 | 2.6 | 2.6 | 2.6 | 2.6 | 2.6 | 2.6 | 2.6 | 2.6 |
| Resin 1 | 20.5 | 20.5 | 20.5 | 20.5 | 20.5 | 20.5 | 20.5 | 20.5 | 20.5 | 20.5 | 20.5 | 20.5 |
| Lucerin TPO | 2.2 | 2.2 | 2.2 | 2.2 | 2.2 | 2.2 | 2.2 | 2.2 | 2.2 | 2.2 | 2.2 | 2.2 |
| Omnirad 481 | 4.0 | 4.0 | 4.0 | 4.0 | 4.0 | 4.0 | 4.0 | 4.0 | 4.0 | 4.0 | 4.0 | 4.0 |
| Ebecryl 350 | 0.5 | 0.5 | 0.5 | 0.5 | 0.5 | 0.5 | 0.5 | 0.5 | 0.5 | 0.5 | 0.5 | 0.5 |
| Dispersion 1 | 10.0 | 10.0 | 10.0 | 10.0 | 10.0 | 10.0 | 10.0 | 10.0 | 10.0 | 10.0 | 10.0 | 10.0 |
| IrganoxMD1024 | 0.1 | 0.2 | 0.5 | 1.0 | — | — | — | — | — | — | — | — |
| Phenothiazine | — | — | — | — | 0.1 | 0.2 | 0.5 | 1.0 | — | — | — | — |
| Irganox245 | — | — | — | — | — | — | — | — | 0.1 | 0.2 | 0.5 | 1.0 |
| Viscosity 50° C. | 12.1 | 12.2 | 12.3 | 12.5 | 11.8 | 118 | 11.9 | 12.0 | 12.4 | 12.2 | 12.4 | 12.7 |
| SLRI | 3 | 2 | 3 | 3 | 2 | 2 | 3 | 5 | 3 | 3 | 3 | 3 |
| Water Resistance | >100 | >100 | >100 | >100 | >100 | >100 | 2 | 2 | >100 | >100 | >100 | >100 |
| Solvent Resistance | 54 | 74 | 48 | 50 | 20 | 42 | 1 | 2 | 50 | 40 | 50 | 65 |

Irganox MD1024: 2',3-bis[[3-[3,5-di-tert-butyk-4-hydroxyphenyl]propionyl]propionohydrazide ex BASF
Phenothiazine: ex Hubei MaxSource Chemical Company
Irganox245: Triethylene glycol bis(3-tert-butyl-4-hydroxy-5-methylphenyl)propionate ex BASF As shown in Table 4, the stabilizers Irganox MD 1024 and Irganox 245 do not give an increase in SLRI even when the level of the stabilizer is increased. Phenothiazine shows a big drop in water and solvent resistance when the level of stabilizer is increased to 0.5 and 1% but only a small improvement in SLRI.

TABLE 5

Comparative Examples C37-C48

| Ink Composition | C37 | C38 | C39 | C40 | C41 | C42 | C43 | C44 | C45 | C46 | C47 | C48 |
|---|---|---|---|---|---|---|---|---|---|---|---|---|
| NVC | 21.0 | 21.0 | 21.0 | 21.0 | 21.0 | 21.0 | 21.0 | 21.0 | 21.0 | 21.0 | 21.0 | 21.0 |
| PHEA | 39.1 | 39.0 | 38.7 | 38.2 | 39.1 | 39.0 | 38.7 | 38.2 | 39.1 | 39.0 | 38.7 | 38.2 |
| PONPGDA | 2.6 | 2.6 | 2.6 | 2.6 | 2.6 | 2.6 | 2.6 | 2.6 | 2.6 | 2.6 | 2.6 | 2.6 |
| Resin 1 | 20.5 | 20.5 | 20.5 | 20.5 | 20.5 | 20.5 | 20.5 | 20.5 | 20.5 | 20.5 | 20.5 | 20.5 |
| Lucerin TPO | 2.2 | 2.2 | 2.2 | 2.2 | 2.2 | 2.2 | 2.2 | 2.2 | 2.2 | 2.2 | 2.2 | 2.2 |
| Omnirad 481 | 4.0 | 4.0 | 4.0 | 4.0 | 4.0 | 4.0 | 4.0 | 4.0 | 4.0 | 4.0 | 4.0 | 4.0 |
| Ebecryl 350 | 0.5 | 0.5 | 0.5 | 0.5 | 0.5 | 0.5 | 0.5 | 0.5 | 0.5 | 0.5 | 0.5 | 0.5 |
| Dispersion 1 | 10.0 | 10.0 | 10.0 | 10.0 | 10.0 | 10.0 | 10.0 | 10.0 | 10.0 | 10.0 | 10.0 | 10.0 |
| Tinuvin123 | 0.1 | 0.2 | 0.5 | 1.0 | — | — | — | — | — | — | — | — |
| Tinuvin292 | — | — | — | — | 0.1 | 0.2 | 0.5 | 1.0 | — | — | — | — |
| Benzotriazole | — | — | — | — | — | — | — | — | 0.1 | 0.2 | 0.5 | 1.0 |
| Viscosity 50° C. | 12.2 | 12.1 | 12.2 | 12.2 | 12.4 | 12.4 | 12.4 | 12.4 | 11.8 | 11.8 | 11.9 | 12.0 |
| SLRI | 2 | 3 | 3 | 4 | 2 | 4 | 4 | 3 | 1 | 1 | 2 | 5 |
| Water Resistance | >100 | >100 | >100 | >100 | >100 | >100 | >100 | >100 | >100 | >100 | >100 | >100 |
| Solvent Resistance | 95 | 70 | 80 | 90 | 20 | 20 | 40 | 50 | 40 | 40 | 40 | 21 |

Tinuvin123: Alkoxyamine stabilizer ex BASF
Tinuvin292: Hindered amine light stabilizer (HALS) ex BASF
Benzotriazole: ex Sigma Aldrich As show in Table 5, the stabilizers Tinuvin 123, Tinuvin 292 and Benzotriazole do not give a significant increase in SLRI even when the level of the stabilizer is increased.

TABLE 6

Comparative Examples C49-C56

| Ink Composition | C49 | C50 | C51 | C52 | C53 | C54 | C55 | C56 |
|---|---|---|---|---|---|---|---|---|
| NVC | 21.0 | 21.0 | 21.0 | 21.0 | 21.0 | 21.0 | 21.0 | 21.0 |
| PHEA | 39.1 | 39.0 | 38.7 | 38.2 | 39.1 | 39.0 | 38.7 | 38.2 |
| PONPGDA | 2.6 | 2.6 | 2.6 | 2.6 | 2.6 | 2.6 | 2.6 | 2.6 |
| Resin 1 | 20.5 | 20.5 | 20.5 | 20.5 | 20.5 | 20.5 | 20.5 | 20.5 |
| Lucerin TPO | 2.2 | 2.2 | 2.2 | 2.2 | 2.2 | 2.2 | 2.2 | 2.2 |
| Omnirad 481 | 4.0 | 4.0 | 4.0 | 4.0 | 4.0 | 4.0 | 4.0 | 4.0 |
| Ebecryl 350 | 0.5 | 0.5 | 0.5 | 0.5 | 0.5 | 0.5 | 0.5 | 0.5 |
| Dispersion 1 | 10.0 | 10.0 | 10.0 | 10.0 | 10.0 | 10.0 | 10.0 | 10.0 |
| Aminotriazole | 0.1 | 0.2 | 0.5 | 1.0 | — | — | — | — |
| IDL510 | — | — | — | — | 0.1 | 0.2 | 0.5 | 1.0 |
| Viscosity 50° C. | 12.1 | 12.3 | 11.9 | 12.0 | 11.9 | 12.1 | 12.2 | 12.0 |
| SLRI | 3 | 4 | 4 | 4 | 4 | 3 | 4 | 5 |
| Water Resistance | >100 | >100 | >100 | >100 | >100 | >100 | >100 | >100 |
| Solvent Resistance | 95 | 70 | 80 | 90 | 20 | 20 | 40 | 50 |

Aminotriazole: ex Sigma Aldrich
IDL510: Aluminum Salt of nitroso-phenylhydroxylamine ex IDLCHEM As shown in Table 6, the stabilizers aminotriazole and IDL510 do not give an increase in SLRI even when the level of the stabilizer is increased. At levels of 0.2, 0.5, 1% IDL510, a drop in solvent resistance is seen showing a reduction in cure.

TABLE 7

Comparative Examples C57-C68

| Ink Composition | C57 | C58 | C59 | C60 | C61 | C62 | C63 | C64 | C65 | C66 | C67 | C68 |
|---|---|---|---|---|---|---|---|---|---|---|---|---|
| NVC | 21.0 | 21.0 | 21.0 | 21.0 | 21.0 | 21.0 | 21.0 | 21.0 | 21.0 | 21.0 | 21.0 | 21.0 |
| PHEA | 39.1 | 39.0 | 38.7 | 38.2 | 39.1 | 39.0 | 38.7 | 38.2 | 39.1 | 39.0 | 38.7 | 38.2 |
| PONPGDA | 2.6 | 2.6 | 2.6 | 2.6 | 2.6 | 2.6 | 2.6 | 2.6 | 2.6 | 2.6 | 2.6 | 2.6 |

TABLE 7-continued

Comparative Examples C57-C68

| Ink Composition | C57 | C58 | C59 | C60 | C61 | C62 | C63 | C64 | C65 | C66 | C67 | C68 |
|---|---|---|---|---|---|---|---|---|---|---|---|---|
| Resin 1 | 20.5 | 20.5 | 20.5 | 20.5 | 20.5 | 20.5 | 20.5 | 20.5 | 20.5 | 20.5 | 20.5 | 20.5 |
| Lucerin TPO | 2.2 | 2.2 | 2.2 | 2.2 | 2.2 | 2.2 | 2.2 | 2.2 | 2.2 | 2.2 | 2.2 | 2.2 |
| Omnirad 481 | 4.0 | 4.0 | 4.0 | 4.0 | 4.0 | 4.0 | 4.0 | 4.0 | 4.0 | 4.0 | 4.0 | 4.0 |
| Ebecryl 350 | 0.5 | 0.5 | 0.5 | 0.5 | 0.5 | 0.5 | 0.5 | 0.5 | 0.5 | 0.5 | 0.5 | 0.5 |
| Dispersion 1 | 10.0 | 10.0 | 10.0 | 10.0 | 10.0 | 10.0 | 10.0 | 10.0 | 10.0 | 10.0 | 10.0 | 10.0 |
| Irgatec CR76 | — | — | — | — | — | — | — | — | 0.1 | 0.2 | 0.5 | 1.0 |
| Irganox 1010 | 0.1 | 0.2 | 0.5 | 1.0 | — | — | — | — | — | — | — | — |
| Diphenylamine | — | — | — | — | 0.1 | 0.2 | 0.5 | 1.0 | — | — | — | — |
| Viscosity 50° C. | 11.9 | 12.1 | 12.2 | 12.0 | 12.1 | 12.2 | 12.0 | 12.0 | 12.0 | 12.2 | 12.0 | 12.0 |
| SLRI | 3 | 4 | 5 | 4 | 4 | 4 | 4 | 5 | 3 | 3 | 3 | 3 |
| Water Resistance | >100 | >100 | >100 | >100 | >100 | >100 | >100 | >100 | >100 | >100 | >100 | >100 |
| Solvent Resistance | 50 | 30 | 20 | 15 | 20 | 20 | 15 | 5 | 62 | 78 | 49 | 50 |

Irgatec CR76 Alkoxyamine stabilizer ex BASF
Irganox 1010 sterically hindered phenolic stabilizer ex BASF
Diphenylamine ex Sigma Aldrich As shown in Table 7, the stabilizers Irgatec CR76, Irganox 1010 and diphenylamine show only a small change in SLRI even when the level of the stabilizer is increased. Irgatec CR76 and Irganox 1010 also show a reduction in solvent resistance.

TABLE 8

Comparative Examples C69-C72

| Ink Composition | C69 | C70 | C71 | C72 |
|---|---|---|---|---|
| NVC | 21.00 | 24.90 | — | — |
| PHEA | 39.00 | 51.45 | — | — |
| PONPGDA | 2.60 | — | — | — |
| Resin 1 | 20.50 | 4.00 | — | 5.20 |
| Lucerin TPO | 2.20 | 4.80 | — | 4.90 |
| Omnirad 481 | 4.00 | — | 2.00 | — |
| Irgacure 819 | — | 2.60 | 6.00 | 2.60 |
| CN965 | — | 10.30 | 3.00 | 4.50 |
| TDA | — | — | 6.80 | 4.30 |
| CTFA | — | — | 72.1 | 46.85 |
| CN9800 | — | — | 0.20 | 0.20 |
| Ebecryl 350 | 0.5 | 0.5 | — | — |
| Dispersion 1 | 10.00 | 1.30 | 9.70 | 1.30 |
| Ethanox 703 | 0.20 | 0.15 | 0.20 | 0.15 |
| Viscosity 50° C. | 12.1 | 12.0 | 11.8 | 12.1 |
| SLRI | 4 | 1 | 3 | 1 |
| Water Resistance | >100 | >100 | >100 | >100 |
| Solvent Resistance | 42 | 30 | 85 | 32 |

Ethanox 703 Phenolic stabilizer ex Albemarle

Table 8 shows the SLRI for the phenolic stabilizer Ethanox 703.

To show how SLRI is related to the loss of inkjet nozzles, inks C69-C72 were printed on self-adhesive PVC at 50 m²/hour continuous printing for eight hours each day using a roll-to-roll transport system with the printheads in banks of four. The printheads used a scanning printhead with an adjacent UV light source in gloss mode, the printheads were Dimatix S-Class. The print run was carried out with the ambient temperature between 15-30° C. and the humidity between 25-80%. C70 & C72 (SLRI=1) showed missing and deviated nozzles at two months; C71 (SLRI=3) showed missing and deviated nozzles at three months; and C69 (SLRI=4) showed missing and deviated nozzles at three and a half months. Also during this trial, inks with an SLRI of 6-7 were tested and showed missing and deviated nozzles at 5-6 months. These print trial results show that SLRI is directly related to nozzle performance and that inks with SLRI of 1-4 are expected to run for about 2-3½ months in a typical UV inkjet printer before encountering problems associated with missing nozzles; while inks with an SRLI of 6-7 show the problems after 5-6 months; and inks with an SRLI>10 will not exhibit the problems for significantly longer periods.

Specifically, FIG. 5 shows the scanned image of a real printhead nozzle test pattern from a wide format flatbed graphics printer using ink C69 suffering from the effect of stray light.

Field Trials Using Industrial Roll to Roll Printing Comparing E7 to C71:

Ink C71 with a stray light resistance index of 3 and Ink E7 with a stray light resistance index of 15 were printed in a large format graphics industrial roll-to-roll printer. This contains four compact Spectra Dimatix S-Class printheads in two slots each with 128 jet outlets, giving a packing density of 512 jets per head. The jets are equally spaced at 127 microns to give good jet straightness and minimize problems with jet deviation. The 512 jets are controlled by eight independent actuators of which each controls 64 independent jet channels. The single jets are controlled through a serial parallel converter and are arranged in two rows.

The ink is fed through an ink inlet to an intermediate tank with an ink filter and an electronic standard monitoring system. It then proceeds to the "lung" where it is degassed by an osmotic filter. It is heated in the ink lines within the print plates and kept in motion while fed to the piezo print system. The lung and ink leading system in the head allow for operation of the piezo head of up to 20 KHz.

The inks were printed on a range of roll media including bannermedia, vinyl and self adhesive PVC at up to 130 m²/hr. The printhead temperature was maintained at 50° C. and the piezo head operated at a frequency of 8 KHz and a pulse amplitude of 90 v. This gave typically a drop mass of 29-31 ng and a velocity of 8-9 m/s. After three months between 10-15% printheads using Ink C71 showed nozzle deviation while at ten months there were no printhead failures with Ink E7.

Field Trials Using Continuous UV Flatbed Printer Comparing E2 to C69:

Ink C69 with a stray light resistance index of 4 and Ink E2 with a stray light resistance index of 16 were printed in a large format graphics continuous UV flatbed printer. This again contains four compact Spectra Dimatix S-Class printheads in two compact slots each with 128 jet outlets, giving a packing density of 512 jets per head.

The inks were printed on a range of rigid media including acrylic, polycarbonate and aluminium sheets bannermedia, vinyl and self adhesive PVC at up to 120 sheets per hour. After three months between 10-15% printheads using Ink C69 showed nozzle deviation while at ten months there were no printhead failures with Ink E2.

Inventive Examples E9-E16 vs. Comparative Examples C73-C112

63 parts of cyclic trimethylolpropane formal acrylate available from Sartomer as SR531, 15 parts of Solsperse 35000 a dispersant available from Lubrizol and 1 part of Genorad 16 a stabilizer from Rahn were placed under a Silverson high speed stirrer. 21 parts of Fastogen Super Magenta RG a quinacridone pigment red 122 available from DIC Corporation was added slowly with continued stirring until a homogeneous, lump free dispersion was obtained. This is Premix 2.

Pass Premix 2 through the dispermat mill SL-12-C three times and check that the particle size distribution is between 70-400 nm. This is Dispersion 2.

Inks were weighed out according to the composition below and stirred until homogeneous using a silverson mixer.

A 12μ drawdown was prepared on Laneta card and given a dose of 150 mJ/cm$^2$ by putting through a Fusion UV curing rig. The belt speed was set a 30 m/min and the dose was determined using a IL390C Light Bug. The solvent and water resistance was then determined as detailed in the attached test methods.

TABLE 9

Inventive Examples E9-E16

| Ink Composition | E9 | E10 | E11 | E12 | E13 | E14 | E15 | E16 |
|---|---|---|---|---|---|---|---|---|
| DPGDA | 14.8 | 14.8 | 14.8 | 14.8 | 14.8 | 14.8 | 14.8 | 14.8 |
| PHEA | 15.0 | 15.0 | 15.0 | 15.0 | 15.0 | 15.0 | 15.0 | 15.0 |
| HDDA | 34.7 | 34.6 | 34.3 | 33.8 | 34.7 | 34.6 | 34.3 | 33.8 |
| CN3715 | 5.0 | 5.0 | 5.0 | 5.0 | 5.0 | 5.0 | 5.0 | 5.0 |
| Lucerin TPO | 3.9 | 3.9 | 3.9 | 3.9 | 3.9 | 3.9 | 3.9 | 3.9 |
| Omnirad 4PBZ | 1.6 | 1.6 | 1.6 | 1.6 | 1.6 | 1.6 | 1.6 | 1.6 |
| Irgacure 369 | 0.4 | 0.4 | 0.4 | 0.4 | 0.4 | 0.4 | 0.4 | 0.4 |
| Irgacure 819 | 1.1 | 1.1 | 1.1 | 1.1 | 1.1 | 1.1 | 1.1 | 1.1 |
| DETX | 3.2 | 3.2 | 3.2 | 3.2 | 3.2 | 3.2 | 3.2 | 3.2 |
| Dispersion 2 | 20.2 | 20.2 | 20.2 | 20.2 | 20.2 | 20.2 | 20.2 | 20.2 |
| OHTEMPO | 0.1 | 0.2 | 0.5 | 1.0 | — | — | — | — |
| TEMPO | — | — | — | — | 0.1 | 0.2 | 0.5 | 1.0 |
| Viscosity 50° C. | 10.0 | 10.0 | 10.1 | 10.2 | 9.9 | 9.9 | 10.0 | 10.0 |
| SLRI | 4 | 4 | 11 | 26 | 3 | 5 | 14 | 19 |
| Water Resistance | >100 | >100 | >100 | >100 | >100 | >100 | >100 | >100 |
| Solvent Resistance | >100 | >100 | >100 | >100 | >100 | >100 | >100 | >100 |

DPGDA: Dipropylene glycol diacrylate, SR508, ex Sartomer
HDDA: Hexanediol diacrylate, SR238, ex Sartomer
CN3715: Acrylated amine ex Sartomer
Omnirad 4PBZ: 4-Phenylbenzophenone ex IGM Resins
Irgacure 369: 2-benzyl-2-dimethylamino-1-(4-morpholinophenyl)butan-1one ex BASF
Irgacure 819: Bis-acylpohsphine oxide ex BASF
DETX: 2,4-Diethyl-thioxanthone ex Lambson Table 9 shows the SLRI increase for increasing levels of the nitroxy stabilizers OHTEMPO and TEMPO. These formulations do not show any reduction in water or solvent resistance with increased levels of the nitroxy stabilizers. —C84

TABLE 10

Comparative Examples C-79-C84

| Ink Composition | C73 | C74 | C75 | C76 | C77 | C78 | C79 | C80 | C81 | C82 | C83 | C84 |
|---|---|---|---|---|---|---|---|---|---|---|---|---|
| DPGDA | 14.8 | 14.8 | 14.8 | 14.8 | 14.8 | 14.8 | 14.8 | 14.8 | 14.8 | 14.8 | 14.8 | 14.8 |
| PHEA | 15.0 | 15.0 | 15.0 | 15.0 | 15.0 | 15.0 | 15.0 | 15.0 | 15.0 | 15.0 | 15.0 | 15.0 |
| HDDA | 34.7 | 34.6 | 34.3 | 33.8 | 34.7 | 34.6 | 34.3 | 33.8 | 34.7 | 34.6 | 34.3 | 33.8 |
| CN3715 | 5.0 | 5.0 | 5.0 | 5.0 | 5.0 | 5.0 | 5.0 | 5.0 | 5.0 | 5.0 | 5.0 | 5.0 |
| Lucerin TPO | 3.9 | 3.9 | 3.9 | 3.9 | 3.9 | 3.9 | 3.9 | 3.9 | 3.9 | 3.9 | 3.9 | 3.9 |
| Omnirad 4PBZ | 1.6 | 1.6 | 1.6 | 1.6 | 1.6 | 1.6 | 1.6 | 1.6 | 1.6 | 1.6 | 1.6 | 1.6 |
| Irgacure 369 | 0.4 | 0.4 | 0.4 | 0.4 | 0.4 | 0.4 | 0.4 | 0.4 | 0.4 | 0.4 | 0.4 | 0.4 |
| Irgacure 819 | 1.1 | 1.1 | 1.1 | 1.1 | 1.1 | 1.1 | 1.1 | 1.1 | 1.1 | 1.1 | 1.1 | 1.1 |
| DETX | 3.2 | 3.2 | 3.2 | 3.2 | 3.2 | 3.2 | 3.2 | 3.2 | 3.2 | 3.2 | 3.2 | 3.2 |
| Dispersion 2 | 20.2 | 20.2 | 20.2 | 20.2 | 20.2 | 20.2 | 20.2 | 20.2 | 20.2 | 20.2 | 20.2 | 20.2 |
| BHT | 0.1 | 0.2 | 0.5 | 1.0 | — | — | — | — | — | — | — | — |
| MEHQ | — | — | — | — | 0.1 | 0.2 | 0.5 | 1.0 | — | — | — | — |
| HQ | — | — | — | — | — | — | — | — | 0.1 | 0.2 | 0.5 | 1.0 |
| Viscosity 50° C. | 9.8 | 9.9 | 9.9 | 9.9 | 9.8 | 9.9 | 9 9 | 10.0 | 9.9 | 9.9 | 9.9 | 9.9 |
| SLRI | 1 | 1 | 1 | 2 | 1 | 1 | 1 | 2 | 1 | 1 | 2 | 2 |
| Water Resistance | >100 | >100 | >100 | >100 | >100 | >100 | >100 | >100 | >100 | >100 | >100 | >100 |
| Solvent Resistance | >100 | >100 | >100 | >100 | >100 | >100 | >100 | >100 | >100 | >100 | >100 | >100 |

Table 10 shows minimal change in the SLRI with increasing levels of the stabilizers BHT, MEHQ, HQ.

TABLE 11

Comparative Examples C85-C96

| Ink Composition | C85 | C86 | C87 | C88 | C89 | C90 | C91 | C92 | C93 | C94 | C95 | C96 |
|---|---|---|---|---|---|---|---|---|---|---|---|---|
| DPGDA | 14.8 | 14.8 | 14.8 | 14.8 | 14.8 | 14.8 | 14.8 | 14.8 | 14.8 | 14.8 | 14.8 | 14.8 |
| PHEA | 15.0 | 15.0 | 15.0 | 15.0 | 15.0 | 15.0 | 15.0 | 15.0 | 15.0 | 15.0 | 15.0 | 15.0 |

TABLE 11-continued

Comparative Examples C85-C96

| Ink Composition | C85 | C86 | C87 | C88 | C89 | C90 | C91 | C92 | C93 | C94 | C95 | C96 |
|---|---|---|---|---|---|---|---|---|---|---|---|---|
| HDDA | 34.7 | 34.6 | 34.3 | 33.8 | 34.7 | 34.6 | 34.3 | 33.8 | 34.3 | 33.8 | 32.3 | 29.8 |
| CN3715 | 5.0 | 5.0 | 5.0 | 5.0 | 5.0 | 5.0 | 5.0 | 5.0 | 5.0 | 5.0 | 5.0 | 5.0 |
| Lucerin TPO | 3.9 | 3.9 | 3.9 | 3.9 | 3.9 | 3.9 | 3.9 | 3.9 | 3.9 | 3.9 | 3.9 | 3.9 |
| Omnirad 4PBZ | 1.6 | 1.6 | 1.6 | 1.6 | 1.6 | 1.6 | 1.6 | 1.6 | 1.6 | 1.6 | 1.6 | 1.6 |
| Irgacure 369 | 0.4 | 0.4 | 0.4 | 0.4 | 0.4 | 0.4 | 0.4 | 0.4 | 0.4 | 0.4 | 0.4 | 0.4 |
| Irgacure 819 | 1.1 | 1.1 | 1.1 | 1.1 | 1.1 | 1.1 | 1.1 | 1.1 | 1.1 | 1.1 | 1.1 | 1.1 |
| DETX | 3.2 | 3.2 | 3.2 | 3.2 | 3.2 | 3.2 | 3.2 | 3.2 | 3.2 | 3.2 | 3.2 | 3.2 |
| Dispersion 2 | 20.2 | 20.2 | 20.2 | 20.2 | 20.2 | 20.2 | 20.2 | 20.2 | 20.2 | 20.2 | 20.2 | 20.2 |
| Ethanox 703 | 0.1 | 0.2 | 0.5 | 1.0 | — | — | — | — | — | — | — | — |
| Phenothiazine | — | — | — | — | 0.1 | 0.2 | 0.5 | 1.0 | — | — | — | — |
| Irgastab UV22 | — | — | — | — | — | — | — | — | 0.5 | 1.0 | 2.5 | 5.0 |
| Viscosity 50° C. | 9.9 | 9.9 | 9.9 | 10.0 | 9.8 | 9.9 | 9.9 | 9.9 | 9.8 | 9.8 | 9.8 | 9.9 |
| SLRI | 2 | 2 | 2 | 3 | 2 | 2 | 2 | 3 | 1 | 1 | 1 | 3 |
| Water Resistance | >100 | >100 | >100 | >100 | >100 | >100 | >100 | >100 | >100 | >100 | >100 | >100 |
| Solvent Resistance | >100 | >100 | >100 | >100 | >100 | >100 | >100 | >100 | >100 | >100 | >100 | >100 |

Irgastab UV22: 20% 2,6-di-tert-butyl-4-benzylidenecyclohexa-2,5-dienone in GPTA ex BASF Table 11 shows minimal change in the SLRI with increasing levels of the stabilizers Ethanox 703, Phenothiazine, Irgastab UV22.

TABLE 12

Comparative Examples C97-C108

| Ink Composition | C97 | C98 | C99 | C100 | C101 | C102 | C103 | C104 | C105 | C106 | C107 | C108 |
|---|---|---|---|---|---|---|---|---|---|---|---|---|
| DPGDA | 14.8 | 14.8 | 14.8 | 14.8 | 14.8 | 14.8 | 14.8 | 14.8 | 14.8 | 14.8 | 14.8 | 14.8 |
| PHEA | 15.0 | 15.0 | 15.0 | 15.0 | 15.0 | 15.0 | 15.0 | 15.0 | 15.0 | 15.0 | 15.0 | 15.0 |
| HDDA | 34.7 | 34.6 | 34.3 | 33.8 | 34.7 | 34.6 | 34.3 | 33.8 | 34.3 | 33.8 | 32.3 | 29.8 |
| CN3715 | 5.0 | 5.0 | 5.0 | 5.0 | 5.0 | 5.0 | 5.0 | 5.0 | 5.0 | 5.0 | 5.0 | 5.0 |
| Lucerin TPO | 3.9 | 3.9 | 3.9 | 3.9 | 3.9 | 3.9 | 3.9 | 3.9 | 3.9 | 3.9 | 3.9 | 3.9 |
| Omnirad 4PBZ | 1.6 | 1.6 | 1.6 | 1.6 | 1.6 | 1.6 | 1.6 | 1.6 | 1.6 | 1.6 | 1.6 | 1.6 |
| Irgacure 369 | 0.4 | 0.4 | 0.4 | 0.4 | 0.4 | 0.4 | 0.4 | 0.4 | 0.4 | 0.4 | 0.4 | 0.4 |
| Irgacure 819 | 1.1 | 1.1 | 1.1 | 1.1 | 1.1 | 1.1 | 1.1 | 1.1 | 1.1 | 1.1 | 1.1 | 1.1 |
| DETX | 3.2 | 3.2 | 3.2 | 3.2 | 3.2 | 3.2 | 3.2 | 3.2 | 3.2 | 3.2 | 3.2 | 3.2 |
| Dispersion 2 | 20.2 | 20.2 | 20.2 | 20.2 | 20.2 | 20.2 | 20.2 | 20.2 | 20.2 | 20.2 | 20.2 | 20.2 |
| Florstab UV-1 | 0.5 | 1.0 | 2.5 | 5.0 | — | — | — | — | — | — | — | — |
| Florstab UV-8 | — | — | — | — | 0.5 | 1.0 | 2.5 | 5.0 | — | — | — | — |
| IDL510 | — | — | — | — | — | — | — | — | 0.1 | 0.2 | 0.5 | 1.0 |
| Viscosity 50° C. | 9.9 | 9.9 | 10.1 | 10.0 | 9.9 | 9.9 | 9.9 | 10.0 | 9.9 | 9.9 | 9.9 | 9.9 |
| SLRI | 2 | 2 | 2 | 2 | 1 | 1 | 1 | 1 | 1 | 1 | 1 | 1 |
| Water Resistance | >100 | >100 | >100 | >100 | >100 | >100 | >100 | >100 | >100 | >100 | >100 | >100 |
| Solvent Resistance | >100 | >100 | >100 | >100 | >100 | >100 | >100 | >100 | >100 | >100 | >100 | >100 |

Florstab UV-1: Stabilizer ex Kromochem

Table 12 shows minimal change in the SLRI with increasing levels of the stabilizers Florstab UV-1, Florstab UV-8, IDL510.

TABLE 13

Comparative Examples C109-C112

| Ink Composition | C109 | C110 | C111 | C112 |
|---|---|---|---|---|
| DPGDA | 14.8 | 14.8 | 14.8 | 14.8 |
| PHEA | 15.0 | 15.0 | 15.0 | 15.0 |
| HDDA | 34.7 | 34.6 | 34.3 | 33.8 |
| CN3715 | 5.0 | 5.0 | 5.0 | 5.0 |
| Lucerin TPO | 3.9 | 3.9 | 3.9 | 3.9 |
| Omnirad 4PBZ | 1.6 | 1.6 | 1.6 | 1.6 |
| Irgacure 369 | 0.4 | 0.4 | 0.4 | 0.4 |
| Irgacure 819 | 1.1 | 1.1 | 1.1 | 1.1 |
| DETX | 3.2 | 3.2 | 3.2 | 3.2 |
| Dispersion 2 | 20.2 | 20.2 | 20.2 | 20.2 |
| Diphenylamine | 0.1 | 0.2 | 0.5 | 1.0 |
| Viscosity 50° C. | 10.0 | 10.0 | 10.1 | 10.0 |
| Light Resistance Index | 1 | 1 | 1 | 1 |

TABLE 13-continued

Comparative Examples C109-C112

| Ink Composition | C109 | C110 | C111 | C112 |
|---|---|---|---|---|
| Water Resistance | >100 | >100 | >100 | >100 |
| Solvent Resistance | >100 | >100 | >100 | >100 |

Diphenylamine: ex Sigma Aldrich

Table 13 shows no increase in the SLRI with increasing levels of the stabilizer diphenylamine.

Inventive Examples E17-E20 Vs. Comparative Examples C113-C152

48 parts of 2-phenoxyethyl acrylate available from Sartomer as SR339, 13 parts of Solsperse 35000 a dispersant available from Lubrizol, 17 parts of CN2102E an epoxy acrylate oligomer available from Sartomer and 1 part of Genorad 16 a stabilizer from Rahn were placed under a Silverson high speed stirrer. 21 parts of Cromophtal Yellow LA2 a azo nickel pigment yellow 150 available from BASF, was added slowly with continued stirring until a homogeneous, lump free dispersion was obtained. This is Premix 3.

Pass Premix 3 through the dispermat mill SL-12-C three times and check the particle size distribution is between 50-500 nm. This is Dispersion 3.

Inks were weighed out according to the composition below and stirred until homogeneous using a silverson mixer.

A 12µ drawdown was prepared on Laneta card and given a dose of 150 mJ/cm² by putting through a Nordson conveyor with an Integration Technology (395 nm 8 W/cm²) SolidCure LED system. The dose was measured using a EIT Power Puck II.

TABLE 14

Inventive Examples E17-E20

| Ink Composition | E17 | E18 | E19 | E20 |
|---|---|---|---|---|
| NVC | 24.2 | 24.2 | 24.2 | 24.2 |
| TDA | 2.9 | 2.9 | 2.9 | 2.9 |
| CTFA | 44.4 | 43.9 | 44.4 | 43.9 |
| CN965 | 2.8 | 2.8 | 2.8 | 2.8 |
| Lucerin TPO | 4.9 | 4.9 | 4.9 | 4.9 |
| Irgacure 819 | 1.1 | 1.1 | 1.1 | 1.1 |
| CN3715 | 6.0 | 6.0 | 6.0 | 6.0 |
| SpeedcureITX | 3.0 | 3.0 | 3.0 | 3.0 |
| CN9800 | 0.2 | 0.2 | 0.2 | 0.2 |
| Dispersion 3 | 10.0 | 10.0 | 10.0 | 10.0 |
| OHTEMPO | 0.5 | 1.0 | — | — |
| TEMPO | — | — | 0.5 | 1.0 |
| Viscosity 50° C. | 8.7 | 8.7 | 8.6 | 8.6 |
| SLRI | 7 | 13 | 7 | 11 |
| Water Resistance | >100 | >100 | >100 | >100 |
| Solvent Resistance | 12 | 11 | 15 | 13 |

Table 14 shows increase in the SLRI with increasing levels of the nitroxy stabilizers OHTEMPO, TEMPO. There is minimal affect on the cure as shown by the high water resistance and constant solvent resistance with increasing levels of stabilizer.

TABLE 15

Comparative Examples C113-C124

| Ink Composition | C113 | C114 | C115 | C116 | C117 | C118 | C119 | C120 | C121 | C122 | C123 | C124 |
|---|---|---|---|---|---|---|---|---|---|---|---|---|
| NVC | 24.2 | 24.2 | 24.2 | 24.2 | 24.2 | 24.2 | 24.2 | 24.2 | 24.2 | 24.2 | 24.2 | 24.2 |
| TDA | 2.9 | 2.9 | 2.9 | 2.9 | 2.9 | 2.9 | 2.9 | 2.9 | 2.9 | 2.9 | 2.9 | 2.9 |
| CTFA | 44.8 | 44.7 | 44.4 | 43.9 | 44.8 | 44.7 | 44.4 | 43.9 | 44.8 | 44.7 | 44.4 | 43.9 |
| CN965 | 2.8 | 2.8 | 2.8 | 2.8 | 2.8 | 2.8 | 2.8 | 2.8 | 2.8 | 2.8 | 2.8 | 2.8 |
| Lucerin TPO | 4.9 | 4.9 | 4.9 | 4.9 | 4.9 | 4.9 | 4.9 | 4.9 | 4.9 | 4.9 | 4.9 | 4.9 |
| Irgacure 819 | 1.1 | 1.1 | 1.1 | 1.1 | 1.1 | 1.1 | 1.1 | 1.1 | 1.1 | 1.1 | 1.1 | 1.1 |
| CN3715 | 6.0 | 6.0 | 6.0 | 6.0 | 6.0 | 6.0 | 6.0 | 6.0 | 6.0 | 6.0 | 6.0 | 6.0 |
| SpeedcureITX | 3.0 | 3.0 | 3.0 | 3.0 | 3.0 | 3.0 | 3.0 | 3.0 | 3.0 | 3.0 | 3.0 | 3.0 |
| CN9800 | 0.2 | 0.2 | 0.2 | 0.2 | 0.2 | 0.2 | 0.2 | 0.2 | 0.2 | 0.2 | 0.2 | 0.2 |
| Dispersion 3 | 10.0 | 10.0 | 10.0 | 10.0 | 10.0 | 10.0 | 10.0 | 10.0 | 10.0 | 10.0 | 10.0 | 10.0 |
| BHT | 0.1 | 0.2 | 0.5 | 1.0 | — | — | — | — | — | — | — | — |
| MEHQ | — | — | — | — | 0.1 | 0.2 | 0.5 | 1.0 | — | — | — | — |
| IDL510 | — | — | — | — | — | — | — | — | 0.1 | 0.2 | 0.5 | 1.0 |
| Viscosity 50° C. | 8.6 | 8.6 | 8.6 | 8.7 | 8.6 | 8.6 | 8.6 | 8.7 | 8.7 | 8.7 | 8.7 | 8.7 |
| SLRI | 1 | 1 | 2 | 2 | 1 | 1 | 1 | 1 | 1 | 1 | 1 | 1 |
| Water Resistance | >100 | >100 | >100 | >100 | >100 | >100 | >100 | >100 | >100 | >100 | >100 | >100 |
| Solvent Resistance | 13 | 13 | 10 | 10 | 16 | 12 | 9 | 4 | 11 | 11 | 10 | 9 |

Table 15 shows none or minimal increase in the SLRI with increasing levels of the stabilizers BHT, MEHQ, HQ.

TABLE 16

Comparative Examples C125-C136

| Ink Composition | C125 | C126 | C127 | C128 | C129 | C130 | C131 | C132 | C133 | C134 | C135 | C136 |
|---|---|---|---|---|---|---|---|---|---|---|---|---|
| NVC | 24.2 | 24.2 | 24.2 | 24.2 | 24.2 | 24.2 | 24.2 | 24.2 | 24.2 | 24.2 | 24.2 | 24.2 |
| TDA | 2.9 | 2.9 | 2.9 | 2.9 | 2.9 | 2.9 | 2.9 | 2.9 | 2.9 | 2.9 | 2.9 | 2.9 |
| CTFA | 44.8 | 44.7 | 44.4 | 43.9 | 44.4 | 43.9 | 42.4 | 39.9 | 44.4 | 43.9 | 42.4 | 39.9 |

TABLE 16-continued

Comparative Examples C125-C136

| Ink Composition | C125 | C126 | C127 | C128 | C129 | C130 | C131 | C132 | C133 | C134 | C135 | C136 |
|---|---|---|---|---|---|---|---|---|---|---|---|---|
| CN965 | 2.8 | 2.8 | 2.8 | 2.8 | 2.8 | 2.8 | 2.8 | 2.8 | 2.8 | 2.8 | 2.8 | 2.8 |
| Lucerin TPO | 4.9 | 4.9 | 4.9 | 4.9 | 4.9 | 4.9 | 4.9 | 4.9 | 4.9 | 4.9 | 4.9 | 4.9 |
| Irgacure 819 | 1.1 | 1.1 | 1.1 | 1.1 | 1.1 | 1.1 | 1.1 | 1.1 | 1.1 | 1.1 | 1.1 | 1.1 |
| CN3715 | 6.0 | 6.0 | 6.0 | 6.0 | 6.0 | 6.0 | 6.0 | 6.0 | 6.0 | 6.0 | 6.0 | 6.0 |
| SpeedcureITX | 3.0 | 3.0 | 3.0 | 3.0 | 3.0 | 3.0 | 3.0 | 3.0 | 3.0 | 3.0 | 3.0 | 3.0 |
| CN9800 | 0.2 | 0.2 | 0.2 | 0.2 | 0.2 | 0.2 | 0.2 | 0.2 | 0.2 | 0.2 | 0.2 | 0.2 |
| Dispersion 3 | 10.0 | 10.0 | 10.0 | 10.0 | 10.0 | 10.0 | 10.0 | 10.0 | 10.0 | 10.0 | 10.0 | 10.0 |
| Ethanox 703 | 0.1 | 0.2 | 0.5 | 1.0 | — | — | — | — | — | — | — | — |
| Florstab UV-8 | — | — | — | — | 0.5 | 1.0 | 2.5 | 5.0 | — | — | — | — |
| Florstab UV-1 | — | — | — | — | — | — | — | — | 0.5 | 1.0 | 2.5 | 5.0 |
| Viscosity 50° C. | 8.6 | 8.6 | 8.6 | 8.7 | 8.7 | 8.7 | 8.8 | 8.8 | 8.9 | 8.9 | 9.0 | 9.1 |
| SLRI | 1 | 1 | 2 | 2 | 1 | 1 | 1 | 1 | 1 | 1 | 1 | 1 |
| Water Resistance | >100 | >100 | >100 | >100 | >100 | >100 | >100 | >100 | >100 | >100 | >100 | >100 |
| Solvent Resistance | 9 | 7 | 6 | 5 | 9 | 9 | 9 | 11 | 11 | 11 | 10 | 11 |

Table 16 shows none or minimal increase in the SLRI with increasing levels of the stabilizers Ethanox 703/Florstab UV-1/Florstab UV-8.

TABLE 17

Comparative Examples C137-C148

| Ink Composition | C137 | C138 | C139 | C140 | C141 | C142 | C143 | C144 | C145 | C146 | C147 | C148 |
|---|---|---|---|---|---|---|---|---|---|---|---|---|
| NVC | 24.2 | 24.2 | 24.2 | 24.2 | 24.2 | 24.2 | 24.2 | 24.2 | 24.2 | 24.2 | 24.2 | 24.2 |
| TDA | 2.9 | 2.9 | 2.9 | 2.9 | 2.9 | 2.9 | 2.9 | 2.9 | 2.9 | 2.9 | 2.9 | 2.9 |
| CTFA | 44.8 | 44.7 | 44.4 | 43.9 | 44.8 | 44.7 | 44.4 | 43.9 | 44.4 | 43.9 | 42.4 | 39.9 |
| CN965 | 2.8 | 2.8 | 2.8 | 2.8 | 2.8 | 2.8 | 2.8 | 2.8 | 2.8 | 2.8 | 2.8 | 2.8 |
| Lucerin TPO | 4.9 | 4.9 | 4.9 | 4.9 | 4.9 | 4.9 | 4.9 | 4.9 | 4.9 | 4.9 | 4.9 | 4.9 |
| Irgacure 819 | 1.1 | 1.1 | 1.1 | 1.1 | 1.1 | 1.1 | 1.1 | 1.1 | 1.1 | 1.1 | 1.1 | 1.1 |
| CN3715 | 6.0 | 6.0 | 6.0 | 6.0 | 6.0 | 6.0 | 6.0 | 6.0 | 6.0 | 6.0 | 6.0 | 6.0 |
| SpeedcureITX | 3.0 | 3.0 | 3.0 | 3.0 | 3.0 | 3.0 | 3.0 | 3.0 | 3.0 | 3.0 | 3.0 | 3.0 |
| CN9800 | 0.2 | 0.2 | 0.2 | 0.2 | 0.2 | 0.2 | 0.2 | 0.2 | 0.2 | 0.2 | 0.2 | 0.2 |
| Dispersion 3 | 10.0 | 10.0 | 10.0 | 10.0 | 10.0 | 10.0 | 10.0 | 10.0 | 10.0 | 10.0 | 10.0 | 10.0 |
| Diphenylamine | 0.1 | 0.2 | 0.5 | 1.0 | — | — | — | — | — | — | — | — |
| IDL510 | — | — | — | — | 0.1 | 0.2 | 0.5 | 1.0 | — | — | — | — |
| IrgastabUV22 | — | — | — | — | — | — | — | — | 0.5 | 1.0 | 2.5 | 5.0 |
| Viscosity | 8.5 | 8.5 | 8.6 | 8.6 | 8.6 | 8.6 | 8.6 | 8.7 | 8.6 | 8.6 | 8.7 | 8.8 |
| SLRI | 1 | 1 | 1 | 1 | 1 | 1 | 1 | 2 | 1 | 1 | 3 | 4 |
| Water Resistance | >100 | >100 | >100 | >100 | 69 | 68 | 70 | 52 | >100 | >100 | >100 | >100 |
| Solvent Resistance | 14 | 12 | 12 | 8 | 25 | 16 | 10 | 9 | 13 | 13 | 11 | 10 |

Table 17 shows none or minimal increase in the SLRI with increasing levels of the stabilizers diphenylamine and IDL510. Increasing levels of Irgastab UV22 does show a small increase in SLRI.

TABLE 18

Comparative Examples C149-C152

| Ink Composition | C149 | C150 | C151 | C152 |
|---|---|---|---|---|
| NVC | 24.2 | 24.2 | 24.2 | 24.2 |
| TDA | 2.9 | 2.9 | 2.9 | 2.9 |
| CTFA | 44.8 | 44.7 | 44.4 | 43.9 |
| CN965 | 2.8 | 2.8 | 2.8 | 2.8 |
| Lucerin TPO | 4.9 | 4.9 | 4.9 | 4.9 |
| Irgacure 819 | 1.1 | 1.1 | 1.1 | 1.1 |
| CN3715 | 6.0 | 6.0 | 6.0 | 6.0 |
| SpeedcureITX | 3.0 | 3.0 | 3.0 | 3.0 |
| CN9800 | 0.2 | 0.2 | 0.2 | 0.2 |
| Dispersion 3 | 10.0 | 10.0 | 10.0 | 10.0 |
| Irganox 1010 | 0.1 | 0.2 | 0.5 | 1.0 |
| Viscosity 50° C. | 8.6 | 8.6 | 8.6 | 8.7 |
| SLRI | 1 | 1 | 1 | 1 |
| Water Resistance | >100 | >100 | >100 | >100 |
| Solvent Resistance | 10 | 11 | 8 | 8 |

Table 18 shows no increase in the SLRI is seen with increasing levels of the stabilizer Irganox 1010.

Inventive Examples E21-E24 Vs. Comparative Examples C153-C204

The varnish formulations shown below were weighed out into a mixing vessel and stirred until homogeneous being sure to maintain the temperature below 40° C.

A 12μ drawdown was prepared on Laneta card and given a dose of 150 mJ/cm² by putting through a Fusion UV curing rig. The belt speed was set a 30 m/min and the dose was determined using a IL390C Light Bug. The solvent and water resistance was then determined as detailed in the attached test methods.

TABLE 19

| Inventive Examples E21-E24 | | | | |
|---|---|---|---|---|
| Ink Composition | E21 | E22 | E23 | E24 |
| PONPGDA | 52.4 | 52.3 | 52.4 | 52.3 |
| DiTMPTA | 7.0 | 7.0 | 7.0 | 7.0 |
| TMPEOTA | 13.5 | 13.5 | 13.5 | 13.5 |
| RAPICURE DVE3 | 12 | 12 | 12 | 12 |
| ESACURE KIP100 | 2.0 | 2.0 | 2.0 | 2.0 |
| OMNIRAD BP | 5.0 | 5.0 | 5.0 | 5.0 |
| CN3715 | 7.0 | 7.0 | 7.0 | 7.0 |
| TEGO A115 | 1.0 | 1.0 | 1.0 | 1.0 |
| OHTEMPO | 0.1 | 0.2 | | |
| TEMPO | | | 0.1 | 0.2 |
| IDL510 | | | | |
| Viscosity 50° C. | 8.1 | 8.1 | 8.1 | 8.1 |
| SLRI | 23 | 44 | 16 | 24 |

TABLE 19-continued

| Inventive Examples E21-E24 | | | | |
|---|---|---|---|---|
| Ink Composition | E21 | E22 | E23 | E24 |
| Water Resistance | >100 | 86 | >100 | >100 |
| Solvent Resistance | 18 | 7 | 19 | 17 |

DiTMPTA: Di-trimethylolpropane tetraacrylate, SR355, ex Sartomer
TMPEOTA: Ethoxylated(3) trimethylolpropane triacrylate, SR454, ex Sartomer
RAPICURE DVE3: triethyleneglycoi divinylether ex ISP Corporation
ESACURE KIP100: liquid mixture of alpha OH-ketones ex Lamberti
OMNIRAD BP: Benzophenone ex IGM Resins
TEGO Al 15: Slip and flow additive ex Tego As shown in Table 19, high SLRI values are obtained with the nitroxy stabilizers OHTEMPO and TEMPO in Examples E21-24.

TABLE 20

| Comparative Examples C153-C156 | | | | |
|---|---|---|---|---|
| Ink Composition | C153 | C154 | C155 | C156 |
| PONPGDA | 52.4 | 52.3 | 52.0 | 51.5 |
| DiTMPTA | 7.0 | 7.0 | 7.0 | 7.0 |
| TMPEOTA | 13.5 | 13.5 | 13.5 | 13.5 |
| RAPICURE DVE3 | 12 | 12 | 12 | 12 |
| ESACURE KIP100 | 2.0 | 2.0 | 2.0 | 2.0 |
| OMNIRAD BP | 5.0 | 5.0 | 5.0 | 5.0 |
| CN3715 | 7.0 | 7.0 | 7.0 | 7.0 |
| TEGO A115 | 1.0 | 1.0 | 1.0 | 1.0 |
| IDL510 | 0.1 | 0.2 | 0.5 | 1.0 |
| Viscosity 50° C. | 8.1 | 8.1 | 8.2 | 8.2 |
| SLRI | 1 | 1 | 2 | 2 |
| Water Resistance | 88 | 65 | 1 | 1 |
| Solvent Resistance | 15 | 11 | 1 | 1 |

As shown in Table 20, minimal change in SLRI is seen in the Comparative examples C153-156 with increasing levels of the stabilizer IDL510.

TABLE 21

| Comparative Examples C157-C168 | | | | | | | | | | | | |
|---|---|---|---|---|---|---|---|---|---|---|---|---|
| Ink Composition | C157 | C158 | C159 | C160 | C161 | C162 | C163 | C164 | C165 | C166 | C167 | C168 |
| PONPGDA | 52.4 | 52.3 | 52.0 | 51.5 | 52.4 | 52.3 | 52.0 | 51.5 | 52.4 | 52.3 | 52.0 | 51.5 |
| DiTMPTA | 7.0 | 7.0 | 7.0 | 7.0 | 7.0 | 7.0 | 7.0 | 7.0 | 7.0 | 7.0 | 7.0 | 7.0 |
| TMPEOTA | 13.5 | 13.5 | 13.5 | 13.5 | 13.5 | 13.5 | 13.5 | 13.5 | 13.5 | 13.5 | 13.5 | 13.5 |
| RAPICURE DVE3 | 12 | 12 | 12 | 12 | 12 | 12 | 12 | 12 | 12 | 12 | 12 | 12 |
| ESACURE KIP100 | 2.0 | 2.0 | 2.0 | 2.0 | 2.0 | 2.0 | 2.0 | 2.0 | 2.0 | 2.0 | 2.0 | 2.0 |
| OMNIRAD BP | 5.0 | 5.0 | 5.0 | 5.0 | 5.0 | 5.0 | 5.0 | 5.0 | 5.0 | 5.0 | 5.0 | 5.0 |
| CN3715 | 7.0 | 7.0 | 7.0 | 7.0 | 7.0 | 7.0 | 7.0 | 7.0 | 7.0 | 7.0 | 7.0 | 7.0 |
| TEGO A115 | 1.0 | 1.0 | 1.0 | 1.0 | 1.0 | 1.0 | 1.0 | 1.0 | 1.0 | 1.0 | 1.0 | 1.0 |
| BHT | 0.1 | 0.2 | 0.5 | 1.0 | — | — | — | — | — | — | — | — |
| MEHQ | — | — | — | — | 0.1 | 0.2 | 0.5 | 1.0 | — | — | — | — |
| HQ | — | — | — | — | — | — | — | — | 0.1 | 0.2 | 0.5 | 1.0 |
| Viscosity 50° C. | 8.0 | 8.0 | 8.0 | 8.1 | 8.0 | 8.0 | 8.0 | 8.1 | 8.0 | 8.0 | 8.1 | 8.1 |
| SLRI | 3 | 4 | 4 | 4 | 3 | 3 | 4 | 5 | 5 | 5 | 6 | 7 |
| Water Resistance | >100 | >100 | >100 | 56 | >100 | >100 | >100 | 76 | >100 | >100 | >100 | 40 |
| Solvent Resistance | >100 | >100 | >100 | 25 | >100 | >100 | >100 | 40 | >100 | >100 | 90 | 20 |

As shown in Table 21, increasing levels of the stabilizers BHT, MEHQ, HQ give only a small increase in the LR value. The SLRI values are much lower than those shown in E21-E24.

TABLE 22

Comparative Examples C169-C180

| Ink Composition | C169 | C170 | C171 | C172 | C173 | C174 | C175 | C176 | C177 | C178 | C179 | C180 |
|---|---|---|---|---|---|---|---|---|---|---|---|---|
| PONPGDA | 52.0 | 51.5 | 50.0 | 47.5 | 52.0 | 51.5 | 50.0 | 47.5 | 52.4 | 52.3 | 52.0 | 51.5 |
| DiTMPTA | 7.0 | 7.0 | 7.0 | 7.0 | 7.0 | 7.0 | 7.0 | 7.0 | 7.0 | 7.0 | 7.0 | 7.0 |
| TMPEOTA | 13.5 | 13.5 | 13.5 | 13.5 | 13.5 | 13.5 | 13.5 | 13.5 | 13.5 | 13.5 | 13.5 | 13.5 |
| RAPICURE DVE3 | 12 | 12 | 12 | 12 | 12 | 12 | 12 | 12 | 12 | 12 | 12 | 12 |
| ESACURE KIP100 | 2.0 | 2.0 | 2.0 | 2.0 | 2.0 | 2.0 | 2.0 | 2.0 | 2.0 | 2.0 | 2.0 | 2.0 |
| OMNIRAD BP | 5.0 | 5.0 | 5.0 | 5.0 | 5.0 | 5.0 | 5.0 | 5.0 | 5.0 | 5.0 | 5.0 | 5.0 |
| CN3715 | 7.0 | 7.0 | 7.0 | 7.0 | 7.0 | 7.0 | 7.0 | 7.0 | 7.0 | 7.0 | 7.0 | 7.0 |
| TEGO A115 | 1.0 | 1.0 | 1.0 | 1.0 | 1.0 | 1.0 | 1.0 | 1.0 | 1.0 | 1.0 | 1.0 | 1.0 |
| Florstab UV-8 | 0.5 | 1.0 | 2.5 | 5.0 | — | — | — | — | — | — | — | — |
| Florstab UV-1 | — | — | — | — | 0.5 | 1.0 | 2.5 | 5.0 | — | — | — | — |
| Phenothiazine | — | — | — | — | — | — | — | — | 0.1 | 0.2 | 0.5 | 1.0 |
| Viscosity 50° C. | 8.2 | 8.2 | 8.3 | 8.3 | 8.1 | 8.2 | 8.2 | 8.3 | 8.1 | 8.1 | 8.1 | 8.1 |
| SLRI | 2 | 2 | 2 | 3 | 5 | 5 | 5 | 5 | 4 | 5 | 6 | 9 |
| Water Resistance | >100 | >100 | >100 | 78 | >100 | >100 | >100 | 65 | >100 | >100 | >100 | 9 |
| Solvent Resistance | >100 | >100 | >100 | 20 | >100 | >100 | >100 | 40 | >100 | >100 | >100 | 5 |

As shown in Table 22, increasing levels of the stabilizers Florstab UV-1, UV-8 and Phenothiazine give SLRI values that are much lower than those shown in E21-E24. Comparative example CI 80 does show some increase in SLRI but with low values for water and solvent resistance indicating cure is negatively affected.

TABLE 23

Comparative Examples C181-C192

| Ink Composition | C169 | C170 | C171 | C172 | C173 | C174 | C175 | C176 | C177 | C178 | C179 | C180 |
|---|---|---|---|---|---|---|---|---|---|---|---|---|
| PONPGDA | 52.4 | 52.3 | 52.0 | 51.5 | 52.4 | 52.3 | 52.0 | 51.5 | 52.4 | 52.3 | 52.0 | 51.5 |
| DiTMPTA | 7.0 | 7.0 | 7.0 | 7.0 | 7.0 | 7.0 | 7.0 | 7.0 | 7.0 | 7.0 | 7.0 | 7.0 |
| TMPEOTA | 13.5 | 13.5 | 13.5 | 13.5 | 13.5 | 13.5 | 13.5 | 13.5 | 13.5 | 13.5 | 13.5 | 13.5 |
| RAPICURE DVE3 | 12 | 12 | 12 | 12 | 12 | 12 | 12 | 12 | 12 | 12 | 12 | 12 |
| ESACURE KIP100 | 2.0 | 2.0 | 2.0 | 2.0 | 2.0 | 2.0 | 2.0 | 2.0 | 2.0 | 2.0 | 2.0 | 2.0 |
| OMNIRAD BP | 5.0 | 5.0 | 5.0 | 5.0 | 5.0 | 5.0 | 5.0 | 5.0 | 5.0 | 5.0 | 5.0 | 5.0 |
| CN3715 | 7.0 | 7.0 | 7.0 | 7.0 | 7.0 | 7.0 | 7.0 | 7.0 | 7.0 | 7.0 | 7.0 | 7.0 |
| TEGO A115 | 1.0 | 1.0 | 1.0 | 1.0 | 1.0 | 1.0 | 1.0 | 1.0 | 1.0 | 1.0 | 1.0 | 1.0 |
| Irganox 1010 | 0.1 | 0.2 | 0.5 | 1.0 | — | — | — | — | — | — | — | — |
| Irganox MD1024 | — | — | — | — | 0.1 | 0.2 | 0.5 | 1.0 | — | — | — | — |
| Irganox 3052 | — | — | — | — | — | — | — | — | 0.1 | 0.2 | 0.5 | 1.0 |
| Viscosity 50° C. | 8.1 | 8.1 | 8.2 | 8.2 | 8.1 | 8.2 | 8.2 | 8.2 | 8.1 | 8.1 | 8.1 | 8.1 |
| SLRI | 4 | 3 | 3 | 4 | 2 | 3 | 5 | 6 | 2 | 2 | 3 | 4 |
| Water Resistance | >100 | >100 | >100 | 30 | >100 | >100 | 34 | 24 | >100 | >100 | >100 | 43 |
| Solvent Resistance | 90 | 90 | 60 | 10 | 88 | 90 | 17 | 13 | 55 | 55 | 55 | 15 |

As shown in Table 23, increasing levels of the stabilizers Irganox 1010, Irganox MD1024, Irganox 3052 give SLRI values that are much lower than those shown in E21-E24.

TABLE 24

Comparative Examples C193-C204

| Ink Composition | C193 | C194 | C195 | C196 | C197 | C198 | C199 | C200 | C201 | C202 | C203 | C204 |
|---|---|---|---|---|---|---|---|---|---|---|---|---|
| PONPGDA | 52.4 | 52.3 | 52.0 | 51.5 | 52.4 | 52.3 | 52.0 | 51.5 | 52.4 | 52.3 | 52.0 | 51.5 |
| DiTMPTA | 7.0 | 7.0 | 7.0 | 7.0 | 7.0 | 7.0 | 7.0 | 7.0 | 7.0 | 7.0 | 7.0 | 7.0 |

TABLE 24-continued

Comparative Examples C193-C204

| Ink Composition | C193 | C194 | C195 | C196 | C197 | C198 | C199 | C200 | C201 | C202 | C203 | C204 |
|---|---|---|---|---|---|---|---|---|---|---|---|---|
| TMPEOTA | 13.5 | 13.5 | 13.5 | 13.5 | 13.5 | 13.5 | 13.5 | 13.5 | 13.5 | 13.5 | 13.5 | 13.5 |
| RAPICURE DVE3 | 12 | 12 | 12 | 12 | 12 | 12 | 12 | 12 | 12 | 12 | 12 | 12 |
| ESACURE KIP100 | 2.0 | 2.0 | 2.0 | 2.0 | 2.0 | 2.0 | 2.0 | 2.0 | 2.0 | 2.0 | 2.0 | 2.0 |
| OMNIRAD BP | 5.0 | 5.0 | 5.0 | 5.0 | 5.0 | 5.0 | 5.0 | 5.0 | 5.0 | 5.0 | 5.0 | 5.0 |
| CN3715 | 7.0 | 7.0 | 7.0 | 7.0 | 7.0 | 7.0 | 7.0 | 7.0 | 7.0 | 7.0 | 7.0 | 7.0 |
| TEGO A115 | 1.0 | 1.0 | 1.0 | 1.0 | 1.0 | 1.0 | 1.0 | 1.0 | 1.0 | 1.0 | 1.0 | 1.0 |
| Diphenylamine | 0.1 | 0.2 | 0.5 | 1.0 | — | — | — | — | — | — | — | — |
| Tinuvin123 | — | — | — | — | 0.1 | 0.2 | 0.5 | 1.0 | — | — | — | — |
| Tinuvin292 | — | — | — | — | — | — | — | — | 0.1 | 0.2 | 0.5 | 1.0 |
| Viscosity 50° C. | 8.1 | 8.1 | 8.2 | 8.2 | 8.1 | 8.2 | 8.2 | 8.2 | 8.1 | 8.1 | 8.1 | 8.1 |
| SLRI | 1 | 1 | 1 | 1 | 2 | 3 | 3 | 4 | 2 | 2 | 2 | 3 |
| Water Resistance | >100 | >100 | >100 | 42 | >100 | >100 | >100 | 45 | >100 | >100 | >100 | >100 |
| Solvent Resistance | 63 | 65 | 63 | 25 | 60 | 60 | 50 | 20 | >100 | 70 | 70 | 30 |

As shown in Table 24, increasing levels of the stabilizers diphenylamine, Tinuvin123, Tinuvin292 gives very little increase to SLRI.

Inventive Examples E25-E27 and Comparative Examples C205-C241

67 parts of cyclic trimethylolpropane formal acrylate available from Sartomer as SR531, 11 parts of Solsperse 35000 a dispersant available from Lubrizol and 1 part of Genorad 16 a stabilizer from Rahn were placed under a Silverson high speed stirrer. 21 parts of Special Black 250 a black pigment available from Evonik, was added slowly with continued stirring until a homogeneous, lump free dispersion was obtained. This is Premix 4.

Pass Premix 4 through the dispermat mill SL-12-C three times and check the particle size distribution is between 10-450 nm. This is Dispersion 4.

Inks were weighed out according to the composition below and stirred until homogeneous using a silverson mixer.

A 12μ drawdown was prepared on Laneta card and given a dose of 150 mJ/cm$^2$ by putting through a Fusion UV curing rig. The belt speed was set a 30 m/min and the dose was determined using a IL390C Light Bug. The solvent and water resistance was then determined as detailed in the attached test methods.

TABLE 25

Inventive Examples E25-E27

| Ink Composition | E25 | E26 | E27 |
|---|---|---|---|
| NVC | 24.9 | 24.9 | 24.9 |
| PHEA | 26.7 | 26.7 | 26.2 |
| CTFA | 25.0 | 25.0 | 25.0 |
| DiPEPA | 0.5 | 0.5 | 0.5 |
| Lucerin TPO | 4.9 | 4.9 | 4.9 |
| DETX | 2.0 | 2.0 | 2.0 |
| Irgacure 819 | 2.6 | 2.6 | 2.6 |
| Irgacure 369 | 0.9 | 0.9 | 0.9 |
| Tego 410 | 0.5 | 0.5 | 0.5 |
| Dispersion 4 | 11.5 | 11.5 | 11.5 |
| OHTEMPO | 0.5 | — | — |
| TEMPO | — | 0.5 | 1.0 |
| Viscosity 50° C. | 9.3 | 9.3 | 9.3 |
| SLRI | 30 | 11 | 17 |
| Water Resistance | >100 | >100 | >100 |
| Solvent Resistance | 11 | 15 | 11 |

DiPEPA: Di-pentaerythritol pentaacrylate, SR399, ex Sartomer
TEGO 410: Anti slip surface control additive ex Evonik Tego Chemie As shown in Table 25, Examples E25-E27 show good SLRI with the nitroxy stabilizers OHTEMPO and TEMPO.

TABLE 26

Comparative Examples C205-C216

| Ink Composition | C205 | C206 | C207 | C208 | C209 | C210 | C211 | C212 | C213 | C214 | C215 | C216 |
|---|---|---|---|---|---|---|---|---|---|---|---|---|
| NVC | 24.9 | 24.9 | 24.9 | 24.9 | 24.9 | 24.9 | 24.9 | 24.9 | 24.9 | 24.9 | 24.9 | 24.9 |
| PHEA | 27.1 | 27.0 | 26.7 | 26.2 | 27.1 | 27.0 | 26.7 | 26.2 | 27.1 | 27.0 | 26.7 | 26.2 |
| CTFA | 25.0 | 25.0 | 25.0 | 25.0 | 25.0 | 25.0 | 25.0 | 25.0 | 25.0 | 25.0 | 25.0 | 25.0 |
| DiPEPA | 0.5 | 0.5 | 0.5 | 0.5 | 0.5 | 0.5 | 0.5 | 0.5 | 0.5 | 0.5 | 0.5 | 0.5 |
| Lucerin TPO | 4.9 | 4.9 | 4.9 | 4.9 | 4.9 | 4.9 | 4.9 | 4.9 | 4.9 | 4.9 | 4.9 | 4.9 |
| DETX | 2.0 | 2.0 | 2.0 | 2.0 | 2.0 | 2.0 | 2.0 | 2.0 | 2.0 | 2.0 | 2.0 | 2.0 |
| Irgacure 819 | 2.6 | 2.6 | 2.6 | 2.6 | 2.6 | 2.6 | 2.6 | 2.6 | 2.6 | 2.6 | 2.6 | 2.6 |
| Irgacure 369 | 0.9 | 0.9 | 0.9 | 0.9 | 0.9 | 0.9 | 0.9 | 0.9 | 0.9 | 0.9 | 0.9 | 0.9 |
| TEGO 410 | 0.5 | 0.5 | 0.5 | 0.5 | 0.5 | 0.5 | 0.5 | 0.5 | 0.5 | 0.5 | 0.5 | 0.5 |
| Dispersion 4 | 11.5 | 11.5 | 11.5 | 11.5 | 11.5 | 11.5 | 11.5 | 11.5 | 11.5 | 11.5 | 11.5 | 11.5 |
| BHT | 0.1 | 0.2 | 0.5 | 1.0 | — | — | — | — | — | — | — | — |
| MEHQ | — | — | — | — | 0.1 | 0.2 | 0.5 | 1.0 | — | — | — | — |
| HQ | — | — | — | — | — | — | — | — | 0.1 | 0.2 | 0.5 | 1.0 |

TABLE 26-continued

Comparative Examples C205-C216

| Ink Composition | C205 | C206 | C207 | C208 | C209 | C210 | C211 | C212 | C213 | C214 | C215 | C216 |
|---|---|---|---|---|---|---|---|---|---|---|---|---|
| Viscosity 50° C. | 9.3 | 9.3 | 9.3 | 9.3 | 9.3 | 9.3 | 9.3 | 9.3 | 9.3 | 9.3 | 9.3 | 9.3 |
| SLRI | 1 | 1 | 2 | 2 | 1 | 2 | 2 | 2 | 5 | 5 | 6 | 7 |
| Water Resistance | >100 | >100 | >100 | 42 | >100 | >100 | >100 | 45 | >100 | >100 | >100 | >100 |
| Solvent Resistance | 32 | 26 | 28 | 18 | 49 | 50 | 34 | 27 | 20 | 22 | 22 | 9 |

As shown in Table 26, Comparative Examples C205-216 show reduced SLRI for the stabilizers BHT, MEHQ, HQ when compared to the nitroxy stabilizers in Examples E25-E27.

TABLE 27

Comparative Examples C217-C228

| Ink Composition | C217 | C218 | C219 | C220 | C221 | C222 | C223 | C224 | C225 | C226 | C227 | C228 |
|---|---|---|---|---|---|---|---|---|---|---|---|---|
| NVC | 24.9 | 24.9 | 24.9 | 24.9 | 24.9 | 24.9 | 24.9 | 24.9 | 24.9 | 24.9 | 24.9 | 24.9 |
| PHEA | 26.7 | 26.2 | 24.7 | 22.2 | 26.7 | 26.2 | 24.7 | 22.2 | 27.1 | 27.0 | 26.7 | 26.2 |
| CTFA | 25.0 | 25.0 | 25.0 | 25.0 | 25.0 | 25.0 | 25.0 | 25.0 | 25.0 | 25.0 | 25.0 | 25.0 |
| DiPEPA | 0.5 | 0.5 | 0.5 | 0.5 | 0.5 | 0.5 | 0.5 | 0.5 | 0.5 | 0.5 | 0.5 | 0.5 |
| Lucerin TPO | 4.9 | 4.9 | 4.9 | 4.9 | 4.9 | 4.9 | 4.9 | 4.9 | 4.9 | 4.9 | 4.9 | 4.9 |
| DETX | 2.0 | 2.0 | 2.0 | 2.0 | 2.0 | 2.0 | 2.0 | 2.0 | 2.0 | 2.0 | 2.0 | 2.0 |
| Irgacure 819 | 2.6 | 2.6 | 2.6 | 2.6 | 2.6 | 2.6 | 2.6 | 2.6 | 2.6 | 2.6 | 2.6 | 2.6 |
| Irgacure 369 | 0.9 | 0.9 | 0.9 | 0.9 | 0.9 | 0.9 | 0.9 | 0.9 | 0.9 | 0.9 | 0.9 | 0.9 |
| TEGO 410 | 0.5 | 0.5 | 0.5 | 0.5 | 0.5 | 0.5 | 0.5 | 0.5 | 0.5 | 0.5 | 0.5 | 0.5 |
| Dispersion 4 | 11.5 | 11.5 | 11.5 | 11.5 | 11.5 | 11.5 | 11.5 | 11.5 | 11.5 | 11.5 | 11.5 | 11.5 |
| Florstab UV-8 | 0.5 | 1.0 | 2.5 | 5.0 | — | — | — | — | — | — | — | — |
| Florstab UV-1 | — | — | — | — | 0.5 | 1.0 | 2.5 | 5.0 | — | — | — | — |
| Phenothiazine | — | — | — | — | — | — | — | — | 0.1 | 0.2 | 0.5 | 1.0 |
| Viscosity 50° C. | 9.3 | 9.3 | 9.3 | 9.3 | 9.3 | 9.5 | 9.6 | 9.7 | 9.3 | 9.3 | 9.3 | 9.4 |
| SLRI | 1 | 2 | 1 | 1 | 2 | 3 | 3 | 3 | 1 | 1 | 2 | 3 |
| Water Resistance | >100 | >100 | >100 | >100 | >100 | >100 | >100 | >100 | >100 | >100 | >100 | >100 |
| Solvent Resistance | 32 | 39 | 57 | 67 | 29 | 29 | 25 | 29 | 45 | 43 | 32 | 15 |

As shown in Table 27, Comparative Examples C217-228 show reduced SLRI for stabilizers Florstab UV-1, UV-8, Phenothiazine compared to the nitroxy stabilizers in Examples E25-27.

TABLE 28

Comparative Examples C229-C240

| Ink Composition | C229 | C230 | C231 | C232 | C233 | C234 | C235 | C236 | C237 | C238 | C239 | C240 |
|---|---|---|---|---|---|---|---|---|---|---|---|---|
| NVC | 24.9 | 24.9 | 24.9 | 24.9 | 24.9 | 24.9 | 24.9 | 24.9 | 24.9 | 24.9 | 24.9 | 24.9 |
| PHEA | 27.1 | 27.0 | 26.7 | 26.2 | 27.1 | 27.0 | 26.7 | 26.2 | 27.1 | 27.0 | 26.7 | 26.2 |
| CTFA | 25.0 | 25.0 | 25.0 | 25.0 | 25.0 | 25.0 | 25.0 | 25.0 | 25.0 | 25.0 | 25.0 | 25.0 |
| DiPEPA | 0.5 | 0.5 | 0.5 | 0.5 | 0.5 | 0.5 | 0.5 | 0.5 | 0.5 | 0.5 | 0.5 | 0.5 |
| Lucerin TPO | 4.9 | 4.9 | 4.9 | 4.9 | 4.9 | 4.9 | 4.9 | 4.9 | 4.9 | 4.9 | 4.9 | 4.9 |
| DETX | 2.0 | 2.0 | 2.0 | 2.0 | 2.0 | 2.0 | 2.0 | 2.0 | 2.0 | 2.0 | 2.0 | 2.0 |
| Irgacure 819 | 2.6 | 2.6 | 2.6 | 2.6 | 2.6 | 2.6 | 2.6 | 2.6 | 2.6 | 2.6 | 2.6 | 2.6 |
| Irgacure 369 | 0.9 | 0.9 | 0.9 | 0.9 | 0.9 | 0.9 | 0.9 | 0.9 | 0.9 | 0.9 | 0.9 | 0.9 |
| TEGO 410 | 0.5 | 0.5 | 0.5 | 0.5 | 0.5 | 0.5 | 0.5 | 0.5 | 0.5 | 0.5 | 0.5 | 0.5 |
| Dispersion 4 | 11.5 | 11.5 | 11.5 | 11.5 | 11.5 | 11.5 | 11.5 | 11.5 | 11.5 | 11.5 | 11.5 | 11.5 |
| Diphenylamine | 0.1 | 0.2 | 0.5 | 1.0 | — | — | — | — | — | — | — | — |
| Ethanox 703 | — | — | — | — | 0.1 | 0.2 | 0.5 | 1.0 | — | — | — | — |
| IDL510 | — | — | — | — | — | — | — | — | 0.1 | 0.2 | 0.5 | 1.0 |
| Viscosity 50° C. | 9.3 | 9.3 | 9.3 | 9.3 | 9.3 | 9.5 | 9.6 | 9.7 | 9.3 | 9.3 | 9.4 | 9.5 |
| SLRI | 1 | 1 | 1 | 2 | 1 | 3 | 3 | 3 | 1 | 1 | 2 | 2 |
| Water Resistance | >100 | >100 | >100 | >100 | >100 | >100 | >100 | >100 | >100 | >100 | >100 | >100 |

TABLE 28-continued

| Comparative Examples C229-C240 | | | | | | | | | | | | |
|---|---|---|---|---|---|---|---|---|---|---|---|---|
| Ink Composition | C229 | C230 | C231 | C232 | C233 | C234 | C235 | C236 | C237 | C238 | C239 | C240 |
| Solvent Resistance | 41 | 39 | 31 | 26 | 31 | 48 | 34 | 18 | 33 | 34 | 30 | 27 |

As shown in Table 28, Comparative Examples C229-C240 show reduced SLRI for the stabilizers Diphenylamine, Ethanox 703, IDL510 when compared to the nitroxy stabilizers in Examples E25-27.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A process for increasing the stray light resistance of an energy curable inkjet ink comprising:
   adding a nitroxy inhibitor to an energy curable inkjet ink comprising:
   a compound having an ethylenic unsaturated bond;
   a photoinitiator; and
   a coloring agent;
   wherein the energy curable inkjet ink has a stray light resistance index of at least 7.

2. The process of claim 1, wherein the stray light resistance index is at least 9.

3. The process of claim 1, wherein the stray light resistance index is at least 11.

4. The process of claim 1, wherein the nitroxy inhibitor

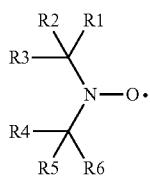

has a following formula:
   wherein R1, R2, R5, and R6 are independently hydrogen, an alkyl group, an aryl group, a halogen substituted alkyl group, or a phosphate group, and
   wherein R3 and R4 are an alkyl group, or R3 and R4 are linked to form a five or six membered heterocyclic aliphatic ring, the five or six membered heterocyclic aliphatic ring being substituted with hydrogen, an hydroxy group, or an aryl group.

5. The process of claim 4, wherein the nitroxy inhibitor is

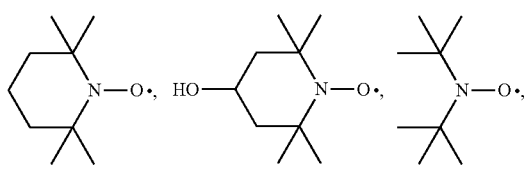

-continued

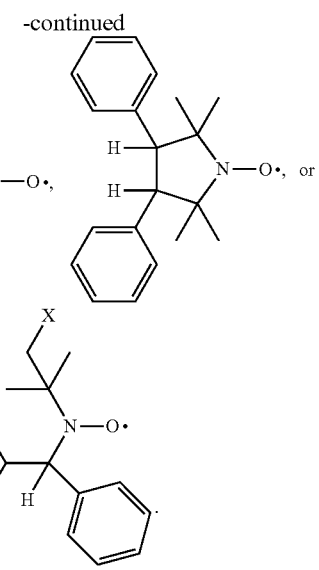

wherein X is F, Cl, Br or I.

6. The process of claim 1, wherein the nitroxy inhibitor is in an amount of about 0.01 wt % to about 1.00 wt % based on a total amount of the energy curable inkjet ink.

7. The process of claim 6, wherein the nitroxy inhibitor is in an amount of about 0.10 wt % to about 0.50 wt % based on a total amount of the energy curable inkjet ink.

8. The process of claim 1, wherein the energy curable inkjet ink further comprises one or more additives,
   wherein the additives are an amine synergist, a de-aerator, a defoamer, or a surface control agent.

9. The process of claim 1,
   wherein the compound having an ethylenic unsaturated bond is a monofunctional ethylenically unsaturated monomer, a polyfunctional ethylenically unsaturated monomer, or a mixture thereof, and is in an amount of 60-90 wt % based on the total weight of the energy curable inkjet ink.

10. The process of claim 1, wherein the photoinitiator is in an amount of 1-20 wt % based on the total weight of the energy curable inkjet ink.

11. The process of claim 1,
   wherein the coloring agent is in an amount of 0.1-30 wt % based on the total weight of the energy curable inkjet ink.

12. A printed article printed with an energy curable inkjet ink prepared by the process of claim 1.

13. A printing process comprising:
   providing the energy curable inkjet ink prepared by the process of claim 1,
   applying the energy curable inkjet ink to an inkjet printer,
   printing the energy curable inkjet ink to a substrate, and
   curing the energy curable inkjet ink with a UV light.

14. A method of preparing an energy curable inkjet ink with stray light resistance comprising:

providing a nitroxy inhibitor;

providing a mixture of a compound having an ethylenic unsaturated bond, and a photoinitiator, and a coloring agent;

combining the nitroxy inhibitor and the mixture to obtain the energy curable inkjet ink and thereby to increase a stray light resistance index of the energy curable inkjet ink to at least 7.

15. The method of claim 14, wherein the stray light resistance index is increased to at least 9.

16. The method of claim 14, wherein the stray light resistance index is increased at least 11.

17. The method of claim 14, wherein the nitroxy inhibitor has a following formula:

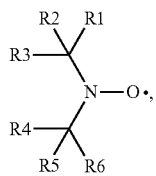

wherein R1, R2, R5, and R6 are independently hydrogen, an alkyl group, an aryl group, a halogen substituted alkyl group, or a phosphate group, and wherein R3 and R4 are an alkyl group, or R3 and R4 are linked to form a five or six membered heterocyclic aliphatic ring, the five or six membered heterocyclic aliphatic ring being substituted with hydrogen, an hydroxy group, or an aryl group.

18. The method of claim 17, wherein the nitroxy inhibitor is

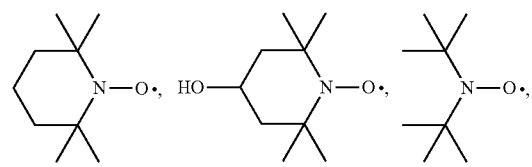

-continued

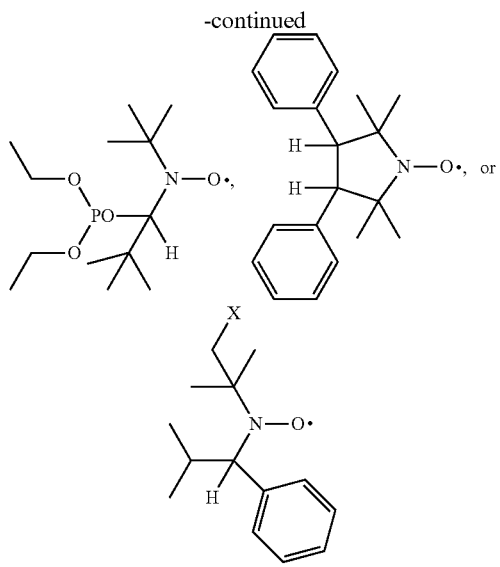

wherein X is F, Cl, Br or I.

19. The method of any one of claim 14, wherein the nitroxy inhibitor is in an amount of about 0.01 wt % to about 1.00 wt % based on a total amount of the energy curable inkjet ink.

20. The method of claim 19, wherein the nitroxy inhibitor is in an amount of about 0.10 wt % to about 0.50 wt % based on a total amount of the energy curable inkjet ink.

21. The method of claim 14,
wherein the energy curable inkjet ink further includes one or more additives, and wherein the additives are an amine synergist, a de-aerator, a defoamer, or a surface control agent.

22. The method of claim 14, wherein the compound having an ethylenic unsaturated bond is a monofunctional ethylenically unsaturated monomer, a polyfunctional ethylenically unsaturated monomer, or a mixture thereof, and is in an amount of 60-90 wt % based on the total weight of the energy curable inkjet ink.

23. The method of claim 14,
wherein the photoinitiator is in an amount of 1-20 wt % based on the total weight of the energy curable inkjet ink.

24. The method of claim 14, wherein the coloring agent is in an amount of 0.1-30 wt% based on the total weight of the energy curable inkjet ink.

* * * * *